US012637978B2

(12) United States Patent
Gernone

(10) Patent No.: US 12,637,978 B2
(45) Date of Patent: May 26, 2026

(54) MULTI-PHASE FLUID FUEL SYSTEMS AND RELATED METHODS

(71) Applicant: GE Avio S.r.l., Rivalta di Torino (IT)

(72) Inventor: Mirko Gernone, Bari (IT)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/057,706

(22) Filed: Feb. 19, 2025

(65) Prior Publication Data

US 2025/0270960 A1 Aug. 28, 2025

(30) Foreign Application Priority Data

Feb. 23, 2024 (IT) ........................ 102024000003898

(51) Int. Cl.
*F02C 7/232* (2006.01)
*B64D 37/02* (2006.01)
(Continued)

(52) U.S. Cl.
CPC ............. *F02C 7/232* (2013.01); *B64D 37/02* (2013.01); *B64D 37/30* (2013.01); *F02C 3/22* (2013.01);
(Continued)

(58) Field of Classification Search
CPC ...... F02C 3/22; F02C 9/40; F02C 7/22; F02C 7/224; B64D 37/02; B64D 37/30;
(Continued)

(56) References Cited

U.S. PATENT DOCUMENTS 5,329,777 A * 7/1994 Weltmer, Jr. ............. F17C 9/02
62/50.2
5,454,408 A * 10/1995 DiBella ................. F04B 9/1176
141/47
(Continued)

FOREIGN PATENT DOCUMENTS

| FR | 3134848 | 10/2023 |
| GB | 2240813 | 8/1991 |
| WO | 2022263307 | 12/2022 |

OTHER PUBLICATIONS

European Patent Office, "Extended European Search Report," issued in connection with European Patent Application No. 25155180.0, dated Jun. 23, 2025, 8 pages.
(Continued)

*Primary Examiner* — Alain Chau
(74) *Attorney, Agent, or Firm* — Hanley, Flight & Zimmerman, LLC

(57) ABSTRACT

Multi-phase fluid fuel systems and related methods are disclosed. An example fuel system includes a liquid hydrogen storage tank to include hydrogen fuel in a liquid phase, and an at least one of gaseous or liquid hydrogen storage tank to include the hydrogen fuel in at least one of a gaseous phase or the liquid phase, a first portion of the hydrogen fuel in at least one of the gaseous phase or the liquid phase to exit the at least one of gaseous or liquid hydrogen storage tank and flow to a combustor of an engine, a second portion of the hydrogen fuel in at least one of the gaseous phase or the liquid phase to exit the at least one of gaseous or liquid hydrogen storage tank and flow to the liquid hydrogen storage tank.

20 Claims, 10 Drawing Sheets

(51) Int. Cl.

| | | |
|---|---|---|
| *B64D 37/30* | (2006.01) | |
| *F02C 3/22* | (2006.01) | |
| *F02C 7/224* | (2006.01) | |
| *F02C 7/236* | (2006.01) | |
| *F02C 9/40* | (2006.01) | |

(52) U.S. Cl.
CPC ................ *F02C 7/224* (2013.01); *F02C 9/40* (2013.01); *F02C 7/236* (2013.01)

(58) Field of Classification Search
CPC . B64D 37/34; B64D 37/14; F17C 9/02; F17C 2221/012; F17C 2227/0135
See application file for complete search history.

(56) References Cited

U.S. PATENT DOCUMENTS

| | | | | |
|---|---|---|---|---|
| 6,939,392 | B2 | 9/2005 | Huang | |
| 7,272,932 | B2 | 9/2007 | Watson | |
| 8,789,379 | B2 * | 7/2014 | Watts | F02M 37/0064 62/50.2 |
| 8,950,195 | B2 | 2/2015 | Watts | |
| 10,989,117 | B2 | 4/2021 | Roberge | |
| 11,674,443 | B2 | 6/2023 | Mccurdy Gibson | |
| 11,760,502 | B2 * | 9/2023 | Palmer | F02C 7/222 60/39.281 |
| 12,092,032 | B1 * | 9/2024 | Dudebout | F02C 7/224 |
| 12,162,621 | B2 * | 12/2024 | Maalouf | F02C 3/22 |
| 12,429,170 | B2 * | 9/2025 | Lacapere | F17C 5/06 |
| 2010/0257839 | A1 | 10/2010 | Watkins | |
| 2010/0287955 | A1 * | 11/2010 | Watts | F02M 37/0064 62/50.6 |
| 2012/0156059 | A1 * | 6/2012 | Watts | B64D 37/30 417/208 |
| 2013/0186059 | A1 | 7/2013 | Epstein | |
| 2014/0182264 | A1 | 7/2014 | Weisgerber | |
| 2015/0121905 | A1 * | 5/2015 | Watts | F17C 7/04 137/1 |
| 2021/0340908 | A1 | 11/2021 | Boucher | |
| 2023/0092811 | A1 * | 3/2023 | Palmer | F02C 3/22 60/39.281 |
| 2023/0212983 | A1 * | 7/2023 | Sibilli | F02C 7/14 60/730 |
| 2023/0265797 | A1 | 8/2023 | Brady | |
| 2024/0263744 | A1 * | 8/2024 | Lacapere | F17C 5/007 |
| 2024/0270402 | A1 * | 8/2024 | Maalouf | F02C 7/232 |
| 2024/0401518 | A1 | 12/2024 | Minas | |

OTHER PUBLICATIONS

Italian Patent and Trademark Office, "Office Action and Search Report," issued in connection with Italian Patent Application No. 102024000003898, dated Sep. 24, 2024, 12 pages.

* cited by examiner

MULTI-PHASE FLUID FUEL SYSTEMS AND RELATED METHODS

RELATED APPLICATION

This patent claims the benefit of Italian Patent Application No. 102024000003898, which was filed on Feb. 23, 2024. Italian Patent Application No. 102024000003898 is hereby incorporated herein by reference in its entirety. Priority to Italian Patent Application No. 102024000003898 is hereby claimed.

FIELD OF THE DISCLOSURE

This disclosure relates generally to gas turbine engines and, more particularly, to multi-phase fluid fuel systems and related methods for gas turbines.

BACKGROUND

A conventional commercial aircraft generally includes a fuselage, a pair of wings, and a propulsion system that provides thrust. The propulsion system typically includes one or more aircraft engines, such as turbofan jet engines. The aircraft engine(s) may be typically mounted to a respective one of the wings of the aircraft, such as in a suspended position beneath the wing.

The aircraft further includes a fuel delivery assembly that generally includes a fuel storage tank (e.g., a storage tank, a fuel tank) and one or more fuel lines that extend between the fuel tank and the aircraft engine(s). Traditional aircraft engines are powered by aviation turbine fuel, which is typically a combustible hydrocarbon liquid fuel, such as a Kerosene-type fuel, having a desired carbon number. The aviation turbine fuel is a relatively power-dense fuel that is relatively easy to transport and stays in a liquid phase through most ambient operating conditions for aircraft.

In recent years, gas turbine engines have utilized mixtures of hydrogen gas and conventional fuels because of the advantages hydrogen gas provides. Specifically, hydrogen is an abundantly available element that has beneficial properties for combustion in gas turbine engines, such as reduced carbon emissions, lower fuel consumption (pounds per hour (pph)), greater energy production, light weight, and high combustion rate and temperature. During combustion of the mixture of hydrogen gas and conventional fuels, chemical energy and thermal energy are converted into mechanical energy. The mechanical energy produced as a result of the combustion can drive downstream turbine blades and provide propulsion to an aircraft or drive a shaft of a generator that produces electric current.

Thus, hydrogen is an abundant fuel source that has additional beneficial properties for combustion in gas turbine engines, such as a high combustion rate and temperature, which can increase an efficiency of the gas turbine engine. Gas turbine engines produce power and/or mechanical drive for aeronautics, marine applications, gear boxes, off-shore power generators, terrestrial power plants, etc. Gas turbine engines can utilize hydrogen gas in addition to other conventional fuels to convert thermal and chemical energy to mechanical energy via combustion. Specifically, a gas turbine engine that utilizes hydrogen gas during combustion can incrementally increase a quantity of energy produced compared to a conventional gas turbine engine that does not utilize hydrogen gas. Further, utilizing hydrogen gas within gas turbine engines reduces harmful carbon emissions, which is a focus of power producers given the emission regulations that have been implemented by legislation.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
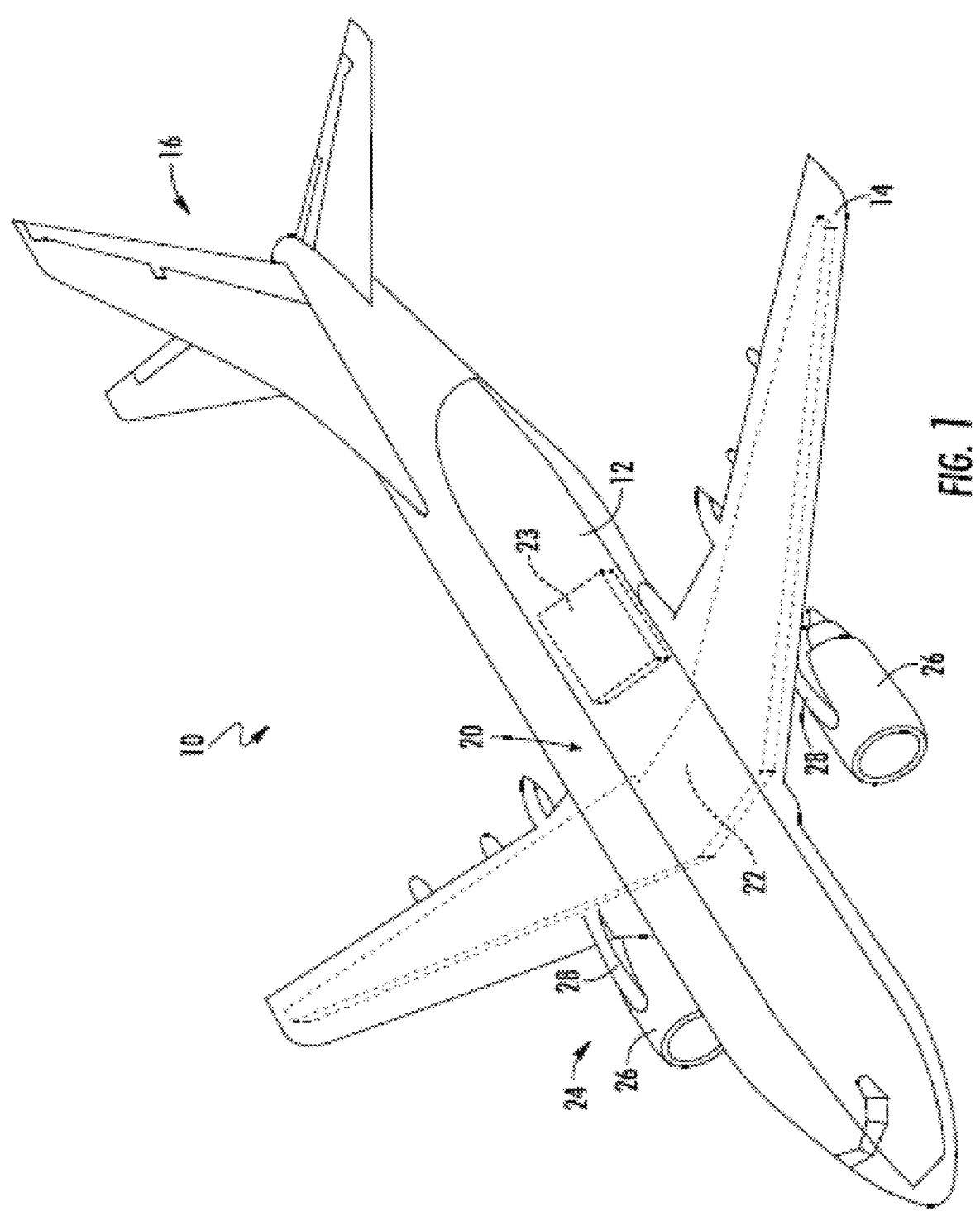
FIG. 1 is a schematic view of an aircraft in which examples disclosed herein can be implemented.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein "integrated circuit/circuitry" is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

Utilizing hydrogen as fuel presents unique challenges compared to the utilization of conventional hydrocarbons. Specifically, gaseous hydrogen can be difficult to store in a quantity that is great enough to fuel a flight. Additionally, liquid hydrogen requires complex pressuring and heating to convert the hydrogen to the gaseous phase and to a temperature and pressure that will enable the hydrogen fuel to combust. In some known implementations, a pump that pumps the hydrogen in the liquid phase includes a first outlet in fluid communication with the combustor and a second outlet through which a portion of the hydrogen fuel exits before being heated and then reintroduced into the liquid hydrogen storage tank to maintain a pressure therein. However, such pumps are complex and difficult to control for both providing fuel to the combustor and returning fuel to the liquid storage tank. Moreover, hydrogen fuel system typically encounter fluctuations in the flow and/or the temperature of the hydrogen fuel that cause an engine output to vary. Additionally, hydrogen fuel systems often face issues associated with synchronization between a fuel pumping system and a fuel metering system, which can result in engine outputs that vary from a target and/or slower adjustments to the engine output.

Example multi-phase fuel systems and related methods are disclosed herein. Although examples disclosed herein are discussed with reference to hydrogen fuel, it should be understood that any other fuel can be utilized (e.g., natural gas (e.g., methane), etc.) in place of hydrogen. Examples herein include a gaseous and/or liquid hydrogen storage tank that enables control of a hydrogen fuel pumping system to be decoupled from a hydrogen fuel metering system to remove issues that may otherwise arise from a lack of synchronization between the fuel pumping portion and the fuel metering portion. Further, examples disclosed herein reduce fluctuations in the flow of hydrogen fuel to a combustor. Specifically, the gaseous hydrogen storage tank disclosed herein serves as a damper against fluctuations in the fluid flow that would otherwise result from the pumping. As a result, the gaseous hydrogen storage tank disclosed herein enables negative displacement pumps (e.g., piston pumps) to be utilized to pump the hydrogen fuel.

The gaseous hydrogen storage tank also damps (e.g., reduces) temperature fluctuations in the hydrogen fuel. For example, the gaseous hydrogen storage tank enables the hydrogen fuel flowing from the gaseous hydrogen storage tank to the combustor to be formed from a mixture of gaseous hydrogen fuel that has been pressurized and heated at different times to different temperatures. As such, the mixture causes the hydrogen downstream of the gaseous hydrogen storage tank to have a more uniform temperature than would otherwise result from not mixing the hydrogen fuel that has been heated and/or pumped at different times in operation.

Additionally, examples disclosed herein include a liquid hydrogen storage tank fluidly coupled to the gaseous hydrogen storage tank. The gaseous hydrogen storage tank enables a pressure in the liquid hydrogen storage tank to be maintained with relatively simple pumps (e.g., pumps that include a single outlet). Examples disclosed herein also simplify controls that are responsive to and cause implementation of a target engine output. For example, the pumping system can maintain the gaseous hydrogen storage tank at a predetermined pressure (e.g., an approximately constant pressure, a constant pressure range) throughout operations associated with the engine (e.g., for more than one power output for the engine, for more than one speed output for the engine) as the flow to the combustor is controlled by the metering system downstream of the gaseous hydrogen storage tank. As a result, the target for the fuel pumping portion of the fuel system can remain constant despite changes in the target engine output.

Referring now to the drawings, FIG. 1 is a perspective view of an example vehicle in which examples disclosed herein may be implemented. Specifically, for the example of FIG. 1, the vehicle is an aeronautical vehicle, or aircraft 10. The aircraft 10 includes a fuselage 12, wings 14 attached to the fuselage 12, an empennage 16, and a fuel system 20. The fuel system 20 includes a liquid hydrogen storage tank 22 (e.g., a liquid hydrogen fuel tank) for holding a first portion of hydrogen fuel in a liquid phase. In the example aircraft 10 shown in FIG. 1, at least a portion of the liquid hydrogen storage tank 22 is located in a wing 14 of the aircraft 10. In some examples, however, the liquid hydrogen storage tank 22 may be located at other suitable locations in the fuselage 12 or the wing 14. It will be appreciated that the first portion of hydrogen fuel is stored in the liquid hydrogen storage tank 22 at a relatively low temperature. For example, the first portion of hydrogen fuel may be stored in the liquid hydrogen storage tank 22 at about −253 Deg. Celsius (° C.) or less at an atmospheric pressure, or at other temperatures and pressures to maintain the hydrogen fuel substantially in the liquid phase. The liquid hydrogen storage tank 22 may be made from known materials such as titanium, Inconel (or other suitable superalloy), aluminum, or composite materials.

In FIG. 1, the example fuel system 20 further includes a gaseous hydrogen storage tank 23 (e.g., a gaseous hydrogen fuel tank) for holding a second portion of hydrogen fuel in a gaseous phase. Although in the example of FIG. 1 the gaseous hydrogen storage tank 23 is positioned within the fuselage 12 of the aircraft 10, in other examples, the gaseous hydrogen storage tank 23 may be positioned at any other suitable location. In some examples, the gaseous hydrogen storage tank 23 may include a plurality of gaseous hydrogen storage tank 23 (in which case the term "gaseous hydrogen storage tank" refers to all of the gaseous hydrogen storage tanks). Further, the gaseous hydrogen storage tank 23 may be configured to store the second portion of hydrogen fuel at an increased pressure so as to reduce a necessary size of the gaseous hydrogen storage tank 23 within the aircraft 10.

The aircraft 10 further includes a propulsion system 24 that produces a propulsive thrust required to propel the aircraft 10 in flight, during taxiing operations, etc. Although the propulsion system 24 is shown attached to the wing(s) 14 in FIG. 1, in other examples it may additionally or alternatively include one or more aspects coupled to other parts of the aircraft 10, such as the empennage 16 and/or the fuselage 12.

In FIG. 1, the propulsion system 24 includes an engine, and more specifically includes a pair of engines. More particularly, each of the engines in the pair of engines is configured as a gas turbine engine 26 (e.g., a turbo engine) mounted to one of the respective wings 14 of the aircraft 10 in an under-wing configuration through a respective pylon 28. Each gas turbine engine 26 is capable of selectively generating a propulsive thrust for the aircraft 10. The amount of propulsive thrust may be controlled at least in part based on a volume (e.g., a mass flowrate) of fuel provided to the gas turbine engines 26 via the fuel system 20.

Figure 2:
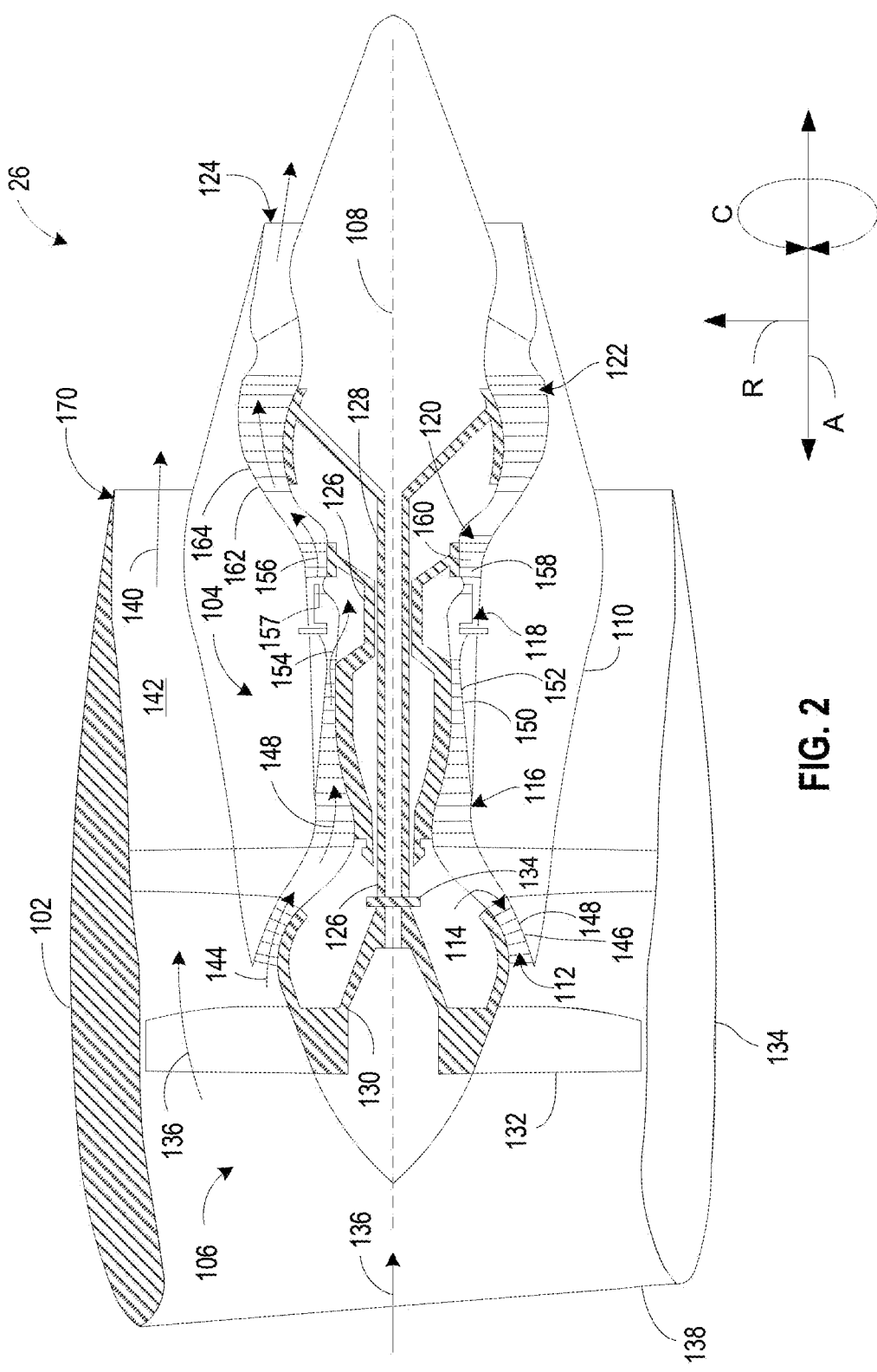
FIG. 2 is a schematic cross-sectional view of an example engine for an aircraft in which examples disclosed herein can be implemented.

FIG. 2 is a schematic cross-sectional view of the example gas turbine engine 26 that can incorporate various examples disclosed herein. The example gas turbine engine 26 can be implemented on an aircraft and therefore referred to as an aircraft engine. In this example, the gas turbine engine 26 is a turbofan-type of engine. However, the principles of the present disclosure are also applicable to other types of engines, such as turboprop engines and engines without a nacelle, such as unducted fan (UDF) engines (sometimes referred to as propfans). Further, the examples disclosed herein can be implemented on other types of engines, such as non-aircraft engines, and/or power generators.

As shown in FIG. 2, the gas turbine engine 26 includes an outer bypass duct 102 (which may also be referred to as a nacelle, fan duct, or outer casing), a core turbine engine 104, and a fan section 106. The core turbine engine 104 and the fan section 106 are disposed at least partially in the outer bypass duct 102. The core turbine engine 104 is disposed downstream from the fan section 106 and drives the fan section 106 to produce forward thrust.

As shown in FIG. 2, the gas turbine engine 26 defines a longitudinal or axial centerline axis 108 extending therethrough for reference. FIG. 2 also includes an annotated directional diagram with reference to an axial direction A, a radial direction R, and a circumferential direction C. In general, as used herein, the axial direction A is a direction that extends generally parallel to the centerline axis 108, the radial direction R is a direction that extends orthogonally outward from or inward toward the centerline axis 108, and the circumferential direction C is a direction that extends concentrically around the centerline axis 108. Further, as used herein, the term "forward" refers to a direction along the centerline axis 108 in the direction of movement of the gas turbine engine 26, such as to the left in FIG. 2, while the term "rearward" refers to a direction along the centerline axis 108 in the opposite direction, such as to the right in FIG. 2.

The core turbine engine 104 includes a substantially tubular outer casing 110 (which may also be referred to as a mid-casing) that defines an annular inlet 112. The outer casing 110 of the core turbine engine 104 can be formed from a single casing or multiple casings. The outer casing 110 encloses, in serial flow relationship, a compressor section having a booster or low pressure compressor 114 ("LP compressor 114") and a high pressure compressor 116 ("HP compressor 116"), a combustion section 118 (which may also be referred to as the combustor 118), a turbine section having a high pressure turbine 120 ("HP turbine 120") and a low pressure turbine 122 ("LP turbine 122"), and an exhaust section 124.

The core turbine engine 104 includes a high pressure shaft 126 ("HP shaft 126") that drivingly couples the HP turbine 120 and the HP compressor 116. The core turbine engine 104 also includes a low pressure shaft 128 ("LP shaft 128") that drivingly couples the LP turbine 122 and the LP compressor 114. The LP shaft 128 also couples to a fan shaft 130.

The fan section 106 includes a plurality of fan blades 132 that are coupled to and extend radially outward from the fan shaft 130. In some examples, the LP shaft 128 may couple directly to the fan shaft 130 (i.e., a direct-drive configuration). In alternative configurations, the LP shaft 128 may couple to the fan shaft 130 via a reduction gear 134 (i.e., an indirect-drive or geared-drive configuration). While in this example the core turbine engine 104 includes two compressor and two turbines, in other examples, the core turbine engine 104 may only include one compressor and one turbine. Further, in other examples, the core turbine engine 104 can include more than two compressors and turbines. In such examples, the core turbine engine 104 may include more than two drive shafts or spools.

As illustrated in FIG. 2, during operation of the gas turbine engine 26, air 136 enters an inlet portion 138 of the gas turbine engine 26. The air 136 is accelerated by the fan blades 132. A first portion 140 of the air 136 flows into a bypass airflow passage 142, while a second portion 144 of the air 136 flows into the inlet 112 of the core turbine engine 104 (and, thus, into the LP compressor 114). Downstream of the inlet 112, one or more sequential stages of LP compressor stator vanes 146 and LP compressor rotor blades 148 coupled to the LP shaft 128 progressively compress the second portion 144 of the air 136 flowing through the LP compressor 114 en route to the HP compressor 116. Next, one or more sequential stages of HP compressor stator vanes 150 and HP compressor rotor blades 152 coupled to the HP shaft 126 further compress the second portion 144 of the air 136 flowing through the HP compressor 116. This provides compressed air 154 to the combustion section 118 where it mixes with fuel and burns to provide combustion gases 156. Fuel is injected into the combustion section 118 by one or more nozzles 157. The gas turbine engine 26 includes a fuel system to provide pressurized fuel through the nozzles 157 to the combustion section 118 of the core turbine engine 104. Example fuel systems are disclosed in further detail herein.

The combustion gases 156 flow through the HP turbine 120 where one or more sequential stages of HP turbine stator vanes 158 and HP turbine rotor blades 160 coupled to the HP shaft 126 extract a first portion of kinetic and/or thermal energy. This energy extraction supports operation of the HP compressor 116. The combustion gases 156 then flow through the LP turbine 122 where one or more sequential stages of LP turbine stator vanes 162 and LP turbine rotor blades 164 coupled to the LP shaft 128 extract a second portion of thermal and/or kinetic energy therefrom. This energy extraction causes the LP shaft 128 to rotate, which supports operation of the LP compressor 114 and/or rotation of the fan shaft 130. The combustion gases 156 then exit the core turbine engine 104 through the exhaust section 124 thereof. The combustion gases 156 mix with the first portion 140 of the air 136 from the bypass airflow passage 142. The combined gases exit an exhaust nozzle 170 (e.g., a converging/diverging nozzle) of the bypass airflow passage 142 to produce propulsive thrust.

Figure 3:
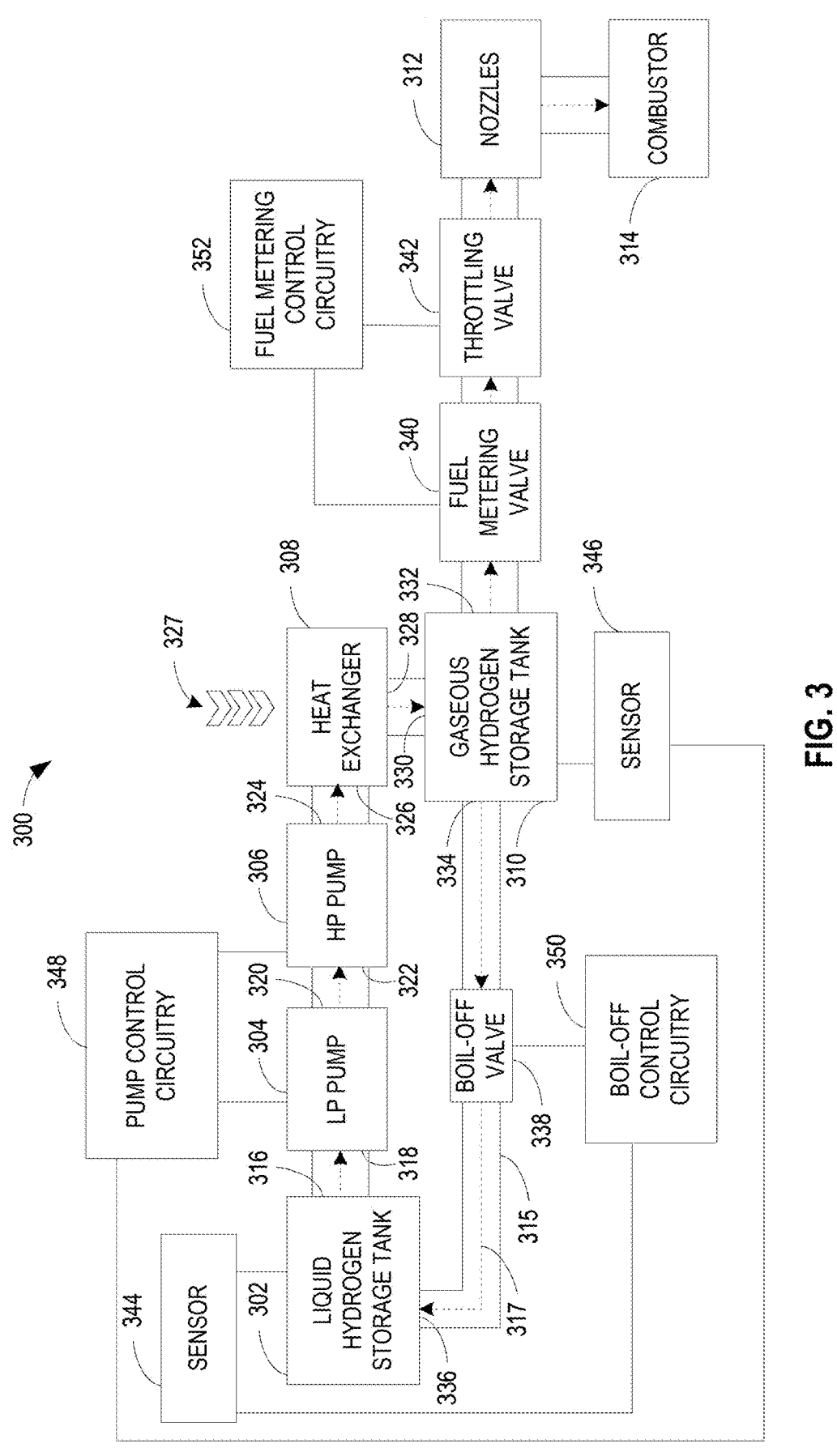
FIG. 3 is a schematic representation of a fuel circuit that may be associated with the aircraft of FIG. 1 and/or the engine of FIG. 2.

FIG. 3 is a schematic representation of a fuel system 300 of the aircraft 10 of FIG. 1 to provide hydrogen fuel to the gas turbine engine 26 of FIGS. 1 and 2 for propulsion. In the illustrated example of FIG. 3, the fuel system 300 includes a liquid hydrogen storage tank 302 (e.g., the liquid hydrogen storage tank 22 of FIG. 1), a low-pressure (LP) pump 304, a high-pressure (HP) pump 306, a heat exchanger 308, a gaseous hydrogen storage tank 310 (e.g., the gaseous hydrogen storage tank 23 of FIG. 1), one or more nozzles 312, and a combustor 314 (e.g., the combustor 118 of FIG. 2). The fuel system 300 includes one or more conduits 315 (e.g., pipes, tubes, etc.) to fluidly couple the liquid hydrogen storage tank 302, the LP pump 304, the HP pump 306, the heat exchanger 308, the gaseous hydrogen storage tank 310, the nozzles 312, and the combustor 314. Accordingly, the conduits 315 define a hydrogen fuel flow path 317, where the direction of the fuel flow for each fuel flow path 317 is designated by an arrow.

In the illustrated example of FIG. 3, the liquid hydrogen storage tank 302 includes hydrogen fuel in a liquid phase (also referred to as a liquid "state"). The conduits 315 carry the hydrogen fuel in the liquid phase from a first outlet 316 of the liquid hydrogen storage tank 302 to a first inlet 318 of the LP pump 304. Specifically, the LP pump 304 pulls a portion of the hydrogen fuel out of the liquid hydrogen storage tank 302. As such, the LP pump 304 receives the hydrogen fuel in the liquid phase. Further, the LP pump 304 can pressurize the hydrogen fuel to increase a pressure and/or a temperature of the hydrogen fuel. The conduits 315 then carry the hydrogen fuel from a second outlet 320 of the LP pump 304 to a second inlet 322 of the HP pump 306, which further increases the pressure and/or the temperature of the hydrogen fuel. In some examples, the LP pump 304 and the HP pump 306 are implemented by positive displacement pumps (e.g., centrifugal pumps) and/or negative displacement pumps (e.g., piston pumps). The fuel system 300, or, more particularly, the gaseous hydrogen storage tank 310, enables damping of fluctuations in the flow of the hydrogen fuel between the pumps 304, 306 and the combustor 314 to advantageously enable utilization of negative displacement pumps that are typically avoided in the aeronautical industry.

In the illustrated example of FIG. 3, the hydrogen fuel exits a third outlet 324 of the HP pump 306 and flows through a third inlet 326 of the heat exchanger 308. The heat exchanger 308 causes the hydrogen fuel to receive thermal energy 327 (e.g., heat). For example, the heat exchanger 308 can cause the hydrogen fuel to receive the thermal energy 327 from an exhaust of the gas turbine engine 26 (e.g., from the combustion gases 156 that exit the core turbine engine 104 through the exhaust section 124 (FIG. 1)). In some examples, the heat exchanger 308 is a trim vaporizer (also referred to as a trim heater). Additionally or alternatively, the heat exchanger 308 can be implemented by an electrical heat exchanger. In some examples, the heat exchanger 308 receives the thermal energy 327 from a fuel cell or another thermal energy source. The conduits 315 carry the hydrogen fuel from a fourth outlet 328 of the heat exchanger 308 to a fourth inlet 330 of the gaseous hydrogen storage tank 310. As a result of the pressure and temperature increases provided by the LP pump 304, the HP pump 306, and the heat exchanger 308, the hydrogen fuel converts from the liquid phase to a gaseous phase (also referred to as a gaseous "state") between the first inlet 318 and the fourth inlet 330.

In the illustrated example of FIG. 3, the gaseous hydrogen storage tank 310 includes a fifth outlet 332 and a sixth outlet 334. A first portion of the hydrogen fuel in the gaseous phase exits the gaseous hydrogen storage tank 310 via the fifth outlet 332 and flows to the nozzles 312 and the combustor 314. A second portion of the hydrogen fuel in the gaseous phase exits the gaseous hydrogen storage tank 310 via the sixth outlet 334 and flows toward the liquid hydrogen storage tank 302 (. Specifically, the hydrogen fuel in the liquid phase in the liquid hydrogen storage tank 302 can convert to the gaseous phase (e.g., the hydrogen fuel in the liquid phase encounters "boil-off") as a result of a pressure reduction in the liquid hydrogen storage tank 302. For example, the reduced pressure can be encountered when a portion of the hydrogen fuel exits the liquid hydrogen storage tank 302 (e.g., flows to the LP pump 304). As such, the second portion of the hydrogen fuel in the gaseous phase that enters the liquid hydrogen storage tank 302 (e.g., via a fifth inlet 336) has a high pressure to balance (e.g., counteract) the pressure loss from the hydrogen fuel in the liquid phase exiting the liquid hydrogen storage tank 302. As a result, the pressure in the liquid hydrogen storage tank 302 can remain approximately constant (e.g., within a constant pressure range), which reduces an amount of the hydrogen fuel in the liquid phase that converts to the gaseous phase in the liquid hydrogen storage tank 302. Accordingly, the first portion of the hydrogen fuel in the gaseous phase is utilized for combustion, and the second portion of the hydrogen fuel in the gaseous phase is utilized to maintain the approximately constant pressure in the liquid hydrogen storage tank 302.

In the illustrated example of FIG. 3, the fuel system 300 also includes a boil-off valve 338, a fuel metering valve 340, and a throttling valve 342. The boil-off valve 338, the fuel metering valve 340, and the throttling valve 342 are actively controlled valves (e.g., valves that include an actuator). In FIG. 3, the boil-off valve 338 is coupled to the conduits 315, the gaseous hydrogen storage tank 310, and/or the liquid hydrogen storage tank 302. For example, the boil-off valve 338 can be positioned at the sixth outlet 334, at the fifth inlet 336, and/or between the sixth outlet 334 and the fifth inlet 336. As such, a position of the boil-off valve 338 controls a flow rate of the second portion of the hydrogen fuel in the gaseous phase that the liquid hydrogen storage tank 302 receives.

In the illustrated example of FIG. 3, the fuel metering valve 340 and the throttling valve 342 are coupled to the conduits 315 between the fifth outlet 332 and the nozzles 312. More particularly, the fuel metering valve 340 is positioned downstream of the fifth outlet 332, the throttling valve 342 is positioned downstream of the fuel metering valve 340, and the nozzles 312 are positioned downstream of the throttling valve 342. The fuel metering valve 340 and the throttling valve 342 control a pressure and/or a mass flow rate of the hydrogen fuel in the gaseous phase that is delivered to the combustor 314. In some examples, the throttling valve 342 is positioned upstream of the fuel metering valve 340, as discussed in association with FIG. 4. In some examples, the fuel metering valve 340 controls the pressure and/or the mass flow rate of the hydrogen fuel in the gaseous phase that is delivered to the combustor 314 without the throttling valve 342, as discussed in association with FIG. 5.

In the illustrated example of FIG. 3, the fuel system 300 includes a first sensor 344 (e.g., a first pressure sensor) operatively coupled to the liquid hydrogen storage tank 302. As such, the first sensor 344 measures a pressure in the liquid hydrogen storage tank 302. Further, the fuel system 300 includes a second sensor 346 (e.g., a second pressure sensor) operatively coupled to the gaseous hydrogen storage tank 310. As such, the second sensor 346 measures a pressure in the gaseous hydrogen storage tank 310.

The fuel system 300 of FIG. 3 includes pump control circuitry 348 to control the LP pump 304 and the HP pump 306 based on a pressure in the gaseous hydrogen storage tank 310 measured by the second sensor 346. More particularly, the pump control circuitry 348 can cause the LP pump 304 and the HP pump 306 to pump and, in turn, pressurize the hydrogen fuel such that a pressure of the hydrogen fuel in the gaseous hydrogen storage tank 310 satisfies (e.g., is greater than, is greater than or equal to) a pressure threshold (e.g., 14.5 pounds per square inch (psi), 72 psi, 1 bar, 5 bar, etc.).

In some examples, the pressure threshold corresponds to a maximum working pressure associated with the combustor 314 (e.g., 400 psi, 800 psi, a pressure of the hydrogen fuel utilized for a maximum output at the combustor 314, etc.). In such examples, the pressure threshold advantageously enables the pump control circuitry 348 to control the LP pump 304 and the HP pump 306 independent of a target output of the gas turbine engine 26, which simplifies the pump control circuitry 348 and control of the LP pump 304 and the HP pump 306.

In some examples, the pressure threshold is based on an operating stage of the gas turbine engine 26. For example, the pressure threshold can be a first pressure threshold when the gas turbine engine 26 is operating at idle power, a second pressure threshold (e.g., another pressure threshold greater than the first pressure threshold) when the gas turbine engine 26 is operating between 40% and 60% speed (e.g., at a revolutions per minute (RPM) between 40% and 60% of a maximum RPM for the gas turbine engine 26), a third pressure threshold (e.g., another pressure threshold greater than the second pressure threshold) when the gas turbine engine 26 is operating between 60% and 80% speed, a fourth threshold (e.g., another pressure threshold greater than the third pressure threshold) when the gas turbine engine 26 is operating between 80% and 100% speed, and a fifth pressure threshold (e.g., another pressure threshold greater than the fourth threshold) when the gas turbine engine 26 is operating at 100% speed. In some examples, the pressure thresholds correspond to a pressure 10% greater than a pressure associated with the target output (e.g., a pressure that the fuel has when entering the combustor 314 to provide the target output).

The pump control circuitry 348 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the pump control circuitry 348 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. In some examples, the pump control circuitry 348 is instantiated by programmable circuitry executing pump control instructions and/or configured to perform operations such as those represented by the flowchart of FIG. 7.

The fuel system 300 of FIG. 3 includes boil-off control circuitry 350 to control a position of the boil-off valve 338 based on a pressure in the liquid hydrogen storage tank 302 that the first sensor 344 measures. More particularly, the boil-off control circuitry 350 controls the flow rate of the second portion of the hydrogen fuel in the gaseous phase that enters the liquid hydrogen storage tank 302 via the boil-off valve 338. As such, the boil-off control circuitry 350 controls an amount of the hydrogen fuel in the gaseous phase that enters the liquid hydrogen storage tank 302 to balance against (e.g., counteract) the pressure loss from the hydrogen fuel in the liquid phase exiting the liquid hydrogen storage tank 302. As a result, the boil-off control circuitry 350 causes the pressure in the liquid hydrogen storage tank 302 to remain approximately constant, which reduces an amount of the hydrogen fuel in the liquid phase that converts to the gaseous phase in the liquid hydrogen storage tank 302. As the LP pump 304 may only be able to pump the hydrogen fuel in the liquid phase, reducing the amount of the hydrogen fuel in the liquid phase that converts to the gaseous phase in the liquid hydrogen storage tank 302 reduces an amount of the hydrogen fuel that is wasted (e.g., unable to be utilized by the combustor 314).

The boil-off control circuitry 350 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the pump control circuitry 348 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. In some examples, the boil-off control circuitry 350 is instantiated by programmable circuitry executing boil-off instructions and/or configured to perform operations such as those represented by the flowchart of FIG. 8.

The fuel system 300 of FIG. 3 includes fuel metering control circuitry 352 to control a flow of the hydrogen fuel delivered to the combustor 314 based on a power output to be provided by the gas turbine engine 26 (FIG. 2). For example, the fuel metering control circuitry 352 can determine, or receive an input indicative of, a speed to be obtained by (e.g., the power output to be provided by) the gas turbine engine 26. Further, the fuel metering control circuitry 352 can identify a pressure and/or a mass flow rate of the hydrogen fuel associated with the power output. In FIG. 3, the fuel metering control circuitry 352 controls the fuel metering valve 340 and/or the throttling valve 342 to adjust the pressure and/or the mass flow rate of the hydrogen fuel to cause the gas turbine engine 26 to obtain the target speed. For example, the fuel metering control circuitry 352 can set a delta pressure (e.g., a pressure differential) to be obtained across the fuel metering valve 340 based on the power output to be provided by the gas turbine engine 26. Further, the fuel metering control circuitry 352 can cause the throttling valve 342 to adjust a pressure downstream of the fuel metering valve 340 based on the delta pressure across the fuel metering valve 340 and the delta pressure set based on the power output to be provided by the gas turbine engine 26.

The fuel metering control circuitry 352 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the fuel metering control circuitry 352 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. In some examples, the fuel metering control circuitry 352 is instantiated by programmable circuitry executing fuel metering instructions and/or configured to perform operations such as those represented by the flowchart of FIG. 9.

It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

Figure 4:
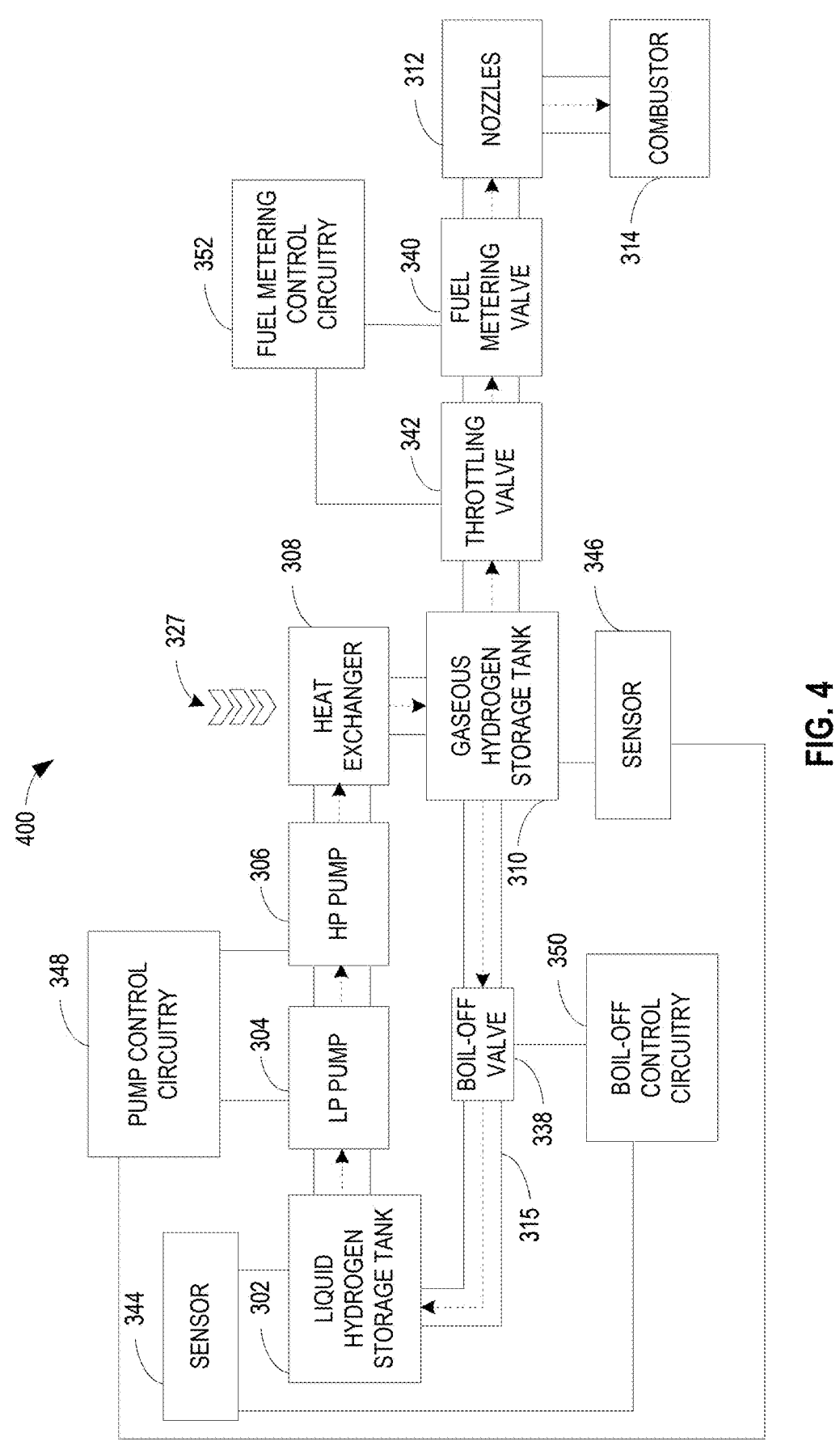
FIG. 4 is a schematic representation of another, alternate fuel circuit that may be associated with the aircraft of FIG. 1 and/or the engine of FIG. 2.

FIG. 4 is a schematic representation of an alternate fuel system 400 of the aircraft 10 of FIG. 1 to provide hydrogen fuel to the gas turbine engine 26 of FIGS. 1 and 2 for propulsion. The fuel system 400 of FIG. 4 includes the liquid hydrogen storage tank 302, the LP pump 304, the HP pump 306, the heat exchanger 308, the gaseous hydrogen storage tank 310, the nozzles 312, the combustor 314, the conduits 315, the boil-off valve 338, the fuel metering valve 340, the throttling valve 342, the first sensor 344, the second sensor 346, the pump control circuitry 348, the boil-off control circuitry 350, and the fuel metering control circuitry 352 of FIG. 3. The fuel system 400 of FIG. 4 is similar to the fuel system 300 of FIG. 3 with a difference being that the throttling valve 342 is positioned upstream of the fuel metering valve 340 in the fuel system 400 of FIG. 4. As such, the fuel metering control circuitry 352 controls the delta pressure across the fuel metering valve 340 by controlling a pressure input that the fuel metering valve 340 receives via the throttling valve 342.

Figure 5:
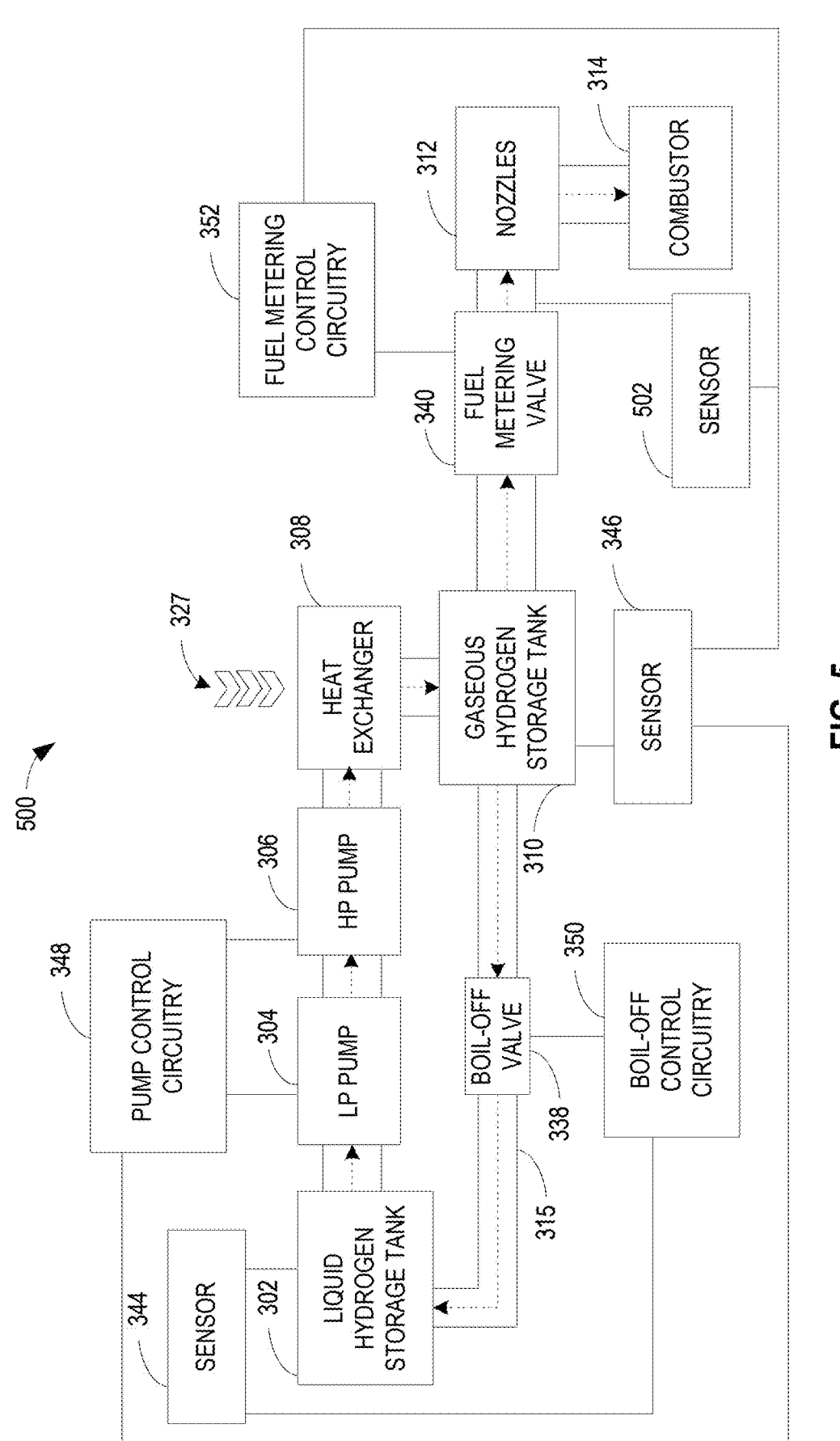
FIG. 5 is a schematic representation of another, alternate fuel circuit that may be associated with the aircraft of FIG. 1 and/or the engine of FIG. 2.

FIG. 5 is a schematic representation of another fuel system 500 of the aircraft 10 of FIG. 1 to provide hydrogen fuel to the gas turbine engine 26 of FIGS. 1 and 2 for propulsion. The fuel system 500 of FIG. 5 includes the liquid hydrogen storage tank 302, the LP pump 304, the HP pump 306, the heat exchanger 308, the gaseous hydrogen storage tank 310, the nozzles 312, the combustor 314, the conduits 315, the thermal energy 327, the boil-off valve 338, the fuel metering valve 340, the first sensor 344, the second sensor 346, the pump control circuitry 348, the boil-off control circuitry 350, and the fuel metering control circuitry 352 of FIG. 3. Additionally, the fuel system 500 of FIG. 5 includes a third sensor 502 (e.g., a third pressure sensor) operatively coupled to the conduits 315 downstream (e.g., at an outlet of) the fuel metering valve 340. As such, the third sensor 502 measures a pressure output of the fuel metering valve 340.

In the illustrated example of FIG. 5, the fuel metering control circuitry 352 is communicatively coupled to the second sensor 346 and the third sensor 502. The fuel metering control circuitry 352 adjusts a position of the fuel metering valve 340 based on a target engine speed or power output and a pressure difference between the gaseous hydrogen storage tank 310 and the combustor 314. Accordingly, the fuel metering control circuitry 352 calculates the position of the fuel metering valve 340 based on a first pressure input from the second sensor 346 and a second pressure input from the third sensor 502. Specifically, the fuel metering control circuitry 352 can determine the position of the fuel metering valve 340 based on a pressure differential between the first pressure input and the second pressure input.

Thus, contrary to the fuel systems 300, 400 of FIGS. 3 and 4, the fuel system 500 of FIG. 5 does not utilize a throttling valve 342. Specifically, the fuel metering control circuitry 352 of FIG. 5 cannot set a movement (e.g., an oscillation) of the throttling valve 342 (FIGS. 3 and 4) to obtain a delta pressure across the fuel metering valve 340 associated with the target engine speed or power output as in the fuel systems 300, 400 of FIGS. 3 and 4. The calculation of the position to be implemented by the fuel metering valve 340 can increase a complexity of the control of the hydrogen fuel flow to the combustor 314, which may cause the fuel system 500 to take more time (e.g., relative to the fuel systems 300, 400 of FIGS. 3 and 4) to obtain the target engine speed or power output.

Figure 6:
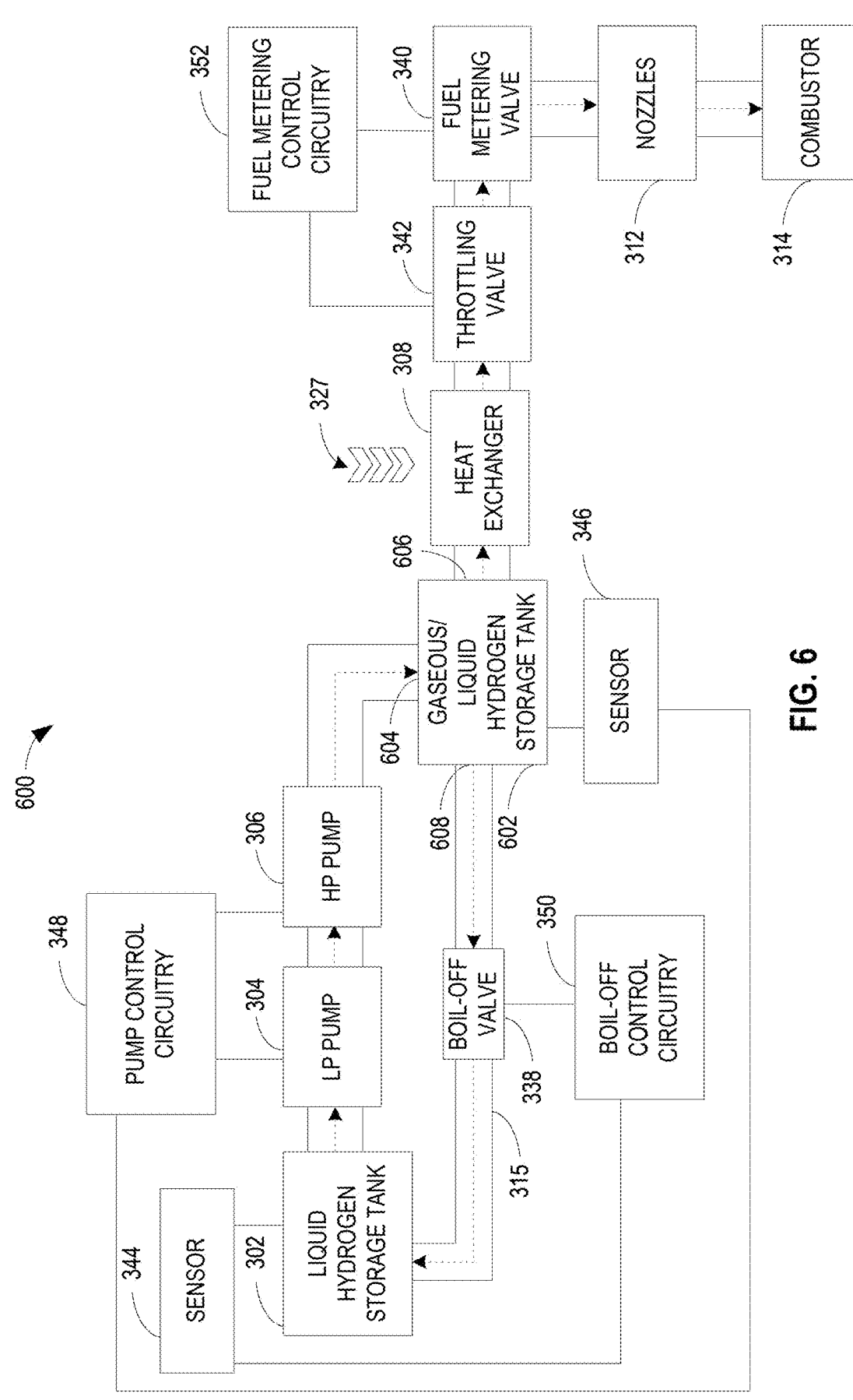
FIG. 6 is a schematic representation of another, alternate fuel circuit that may be associated with the aircraft of FIG. 1 and/or the engine of FIG. 2.

FIG. 6 is a schematic representation of another fuel system 600 of the aircraft 10 of FIG. 1 to provide hydrogen fuel to the gas turbine engine 26 of FIGS. 1 and 2 for propulsion. The fuel system 600 of FIG. 6 includes the liquid hydrogen storage tank 302, the LP pump 304, the HP pump 306, the heat exchanger 308, the nozzles 312, the combustor 314, the conduits 315, the thermal energy 327, the boil-off valve 338, the fuel metering valve 340, the throttling valve 342, the first sensor 344, the second sensor 346, the pump control circuitry 348, the boil-off control circuitry 350, and the fuel metering control circuitry 352 of FIG. 3. Additionally, the fuel system 600 of FIG. 6 includes a gaseous/liquid hydrogen storage tank 602 that includes hydrogen fuel in a gaseous phase and/or a liquid phase. The gaseous/liquid hydrogen storage tank 602 includes an inlet 604, a first outlet 606, and a second outlet 608. The hydrogen fuel that flows through the first outlet 606 flows to the combustor 314. The hydrogen fuel that flows through the second outlet 608 flows to the liquid hydrogen storage tank 302. Although the fuel system 600 of FIG. 6 depicts the fuel metering valve 340 downstream of the throttling valve 342, in some examples, the throttling valve 342 is downstream of the fuel metering valve 340, as discussed in association with FIG. 3. Additionally or alternatively, the fuel system 600 can adjust the flow to the combustor 314 using the fuel metering valve 340 without the throttling valve 342, as discussed in association with FIG. 5.

In the illustrated example of FIG. 6, the gaseous/liquid hydrogen storage tank 602 is positioned upstream of the heat exchanger 308. As such, the heat exchanger 308 heats the hydrogen fuel after the hydrogen fuel exits the first outlet 606 of the gaseous/liquid hydrogen storage tank 602 (e.g., as opposed to before the hydrogen fuel enters the gaseous hydrogen storage tank 310 of FIGS. 3-5 in the fuel systems 300, 400, 500). The LP pump 304 and the HP pump 306 pressurize hydrogen fuel flowing from the liquid hydrogen storage tank 302 to the gaseous/liquid hydrogen storage tank 602. In some examples, the LP pump 304 and the HP pump 306 pressurize the hydrogen fuel such that at least a portion of the hydrogen fuel converts from the liquid phase to the gaseous phase between the liquid hydrogen storage tank 302 and the inlet 604 of the gaseous/liquid hydrogen storage tank 602. In some examples, at least a portion of the hydrogen fuel remains in the liquid phase after being pressurized by the LP pump 304 and the HP pump 306 and, thus, when the portion of the hydrogen fuel enters the gaseous/liquid hydrogen storage tank 602. Accordingly, the gaseous/liquid hydrogen storage tank 602 can contain hydrogen fuel in the liquid phase and/or hydrogen fuel in the gaseous phase.

In the illustrated example of FIG. 6, as a result of the heat exchanger 308 being positioned between the gaseous/liquid hydrogen storage tank 602 and the combustor 314 (e.g., as opposed to upstream of the gaseous/liquid hydrogen storage tank 602), the hydrogen fuel in the gaseous/liquid hydrogen storage tank 602 has a lower temperature than the hydrogen fuel in the gaseous hydrogen storage tank 310 (FIGS. 3-5). As such, the hydrogen fuel that exits the gaseous/liquid hydrogen storage tank 602 via the second outlet 608 and flows to the liquid hydrogen storage tank 302 has a relatively low temperature (e.g., compared to that of the fuel systems 300, 400, 500 of FIGS. 3-5) to reduce an amount of thermal energy that the hydrogen fuel from the gaseous/liquid hydrogen storage tank 602 transfers to the hydrogen fuel in the liquid hydrogen storage tank 302. In some examples, the liquid hydrogen storage tank 302 receives the hydrogen fuel in the liquid phase from the gaseous/liquid hydrogen storage tank 602. The reduction in the thermal energy that the hydrogen fuel in the liquid hydrogen storage tank 302 receives can help prevent the hydrogen gas in the liquid hydrogen storage tank 302 from receiving a substantial temperature increase that could otherwise increase a volume of the hydrogen fuel in the liquid hydrogen storage tank 302 that converts to the gaseous phase. As the LP pump 304, in some examples, is unable to pump fluid that is in a gaseous phase, the reduction in the volume of the hydrogen fuel in the liquid hydrogen storage tank 302 that converts to the gaseous phase enables the fuel system 600 to deliver an increased portion of the hydrogen fuel in the liquid hydrogen storage tank 302 to the combustor 314. Thus, the position of the gaseous/liquid hydrogen storage tank 602 can help increase an efficiency of the fuel system 600.

In some examples, the fuel systems 300, 400, 500, 600 of FIGS. 3-6 include means for injecting hydrogen fuel into a combustor of an engine. For example, the means for injecting may be implemented by the nozzles 312 of FIGS. 3-6.

In some examples, the fuel systems 300, 400, 500, 600 of FIGS. 3-6 include first means for holding hydrogen fuel in a liquid phase. For example, the first means for holding may be implemented by the liquid hydrogen storage tank 22 of FIG. 1 and/or the liquid hydrogen storage tank 302 of FIGS. 3-6.

In some examples, the fuel systems 300, 400, 500, 600 of FIGS. 3-6 include second means for holding the hydrogen fuel in a gaseous phase. For example, the second means for holding may be implemented by the gaseous hydrogen storage tank 23 of FIG. 1, the gaseous hydrogen storage tank 310 of FIGS. 3-5, and/or the gaseous/liquid hydrogen storage tank 602 of FIG. 6.

In some examples, the fuel systems 300, 400, 500, 600 of FIGS. 3-6 include means for pressurizing the hydrogen fuel flowing from the first means for holding to the second means for holding. For example, the means for pressurizing may be implemented by the LP pump 304 and/or the HP pump 306.

In some examples, the fuel systems 300, 400, 500, 600 of FIGS. 3-6 include first means for controlling a flow of the hydrogen fuel from the second means for holding to the means for injecting based on the operations associated with the engine. For example, the first means for controlling may be implemented by the fuel metering valve 340, the throttling valve 342, and the fuel metering control circuitry 352.

In some examples, the fuel systems 300, 400, 500, 600 of FIGS. 3-6 include second means for controlling a flow of the hydrogen fuel from the first means for holding to the second means for holding based on a pressure in the second means for holding. For example, the second means for controlling may be implemented by the LP pump 304, the HP pump 306, and/or the pump control circuitry 348.

In some examples, the fuel systems 300, 400, 500, 600 of FIGS. 3-6 include third means for controlling a flow of the hydrogen from the second means for holding to the first means for holding based on a pressure in the first means for holding. For example, the third means for holding may be implemented by the boil-off valve 338 and/or the boil-off control circuitry 350.

While an example implementation of the pump control circuitry 348, the boil-off control circuitry 350, and the fuel metering control circuitry 352 of FIGS. 3, 4, 5, and 6 is illustrated in FIGS. 3, 4, 5, and 6, one or more of the elements, processes, and/or devices illustrated in FIGS. 3, 4, 5, and 6 may be combined, divided, re-arranged, omitted, eliminated, and/or implemented in any other way. Further, the pump control circuitry 348, the boil-off control circuitry 350, and the fuel metering control circuitry 352 of FIGS. 3, 4, 5, and 6, may be implemented by hardware alone or by hardware in combination with software and/or firmware. Thus, for example, any of the pump control circuitry 348, the boil-off control circuitry 350, and the fuel metering control circuitry 352 of FIGS. 3, 4, 5, and 6, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example pump control circuitry 348, the example boil-off control circuitry 350, and the example fuel metering control circuitry 352 of FIGS. 3, 4, 5, and 6 may include one or more elements, processes, and/or devices in addition to, or instead of, those illustrated in FIGS. 3, 4, 5, and 6, and/or may include more than one of any or all of the illustrated elements, processes and devices.

Figure 7:
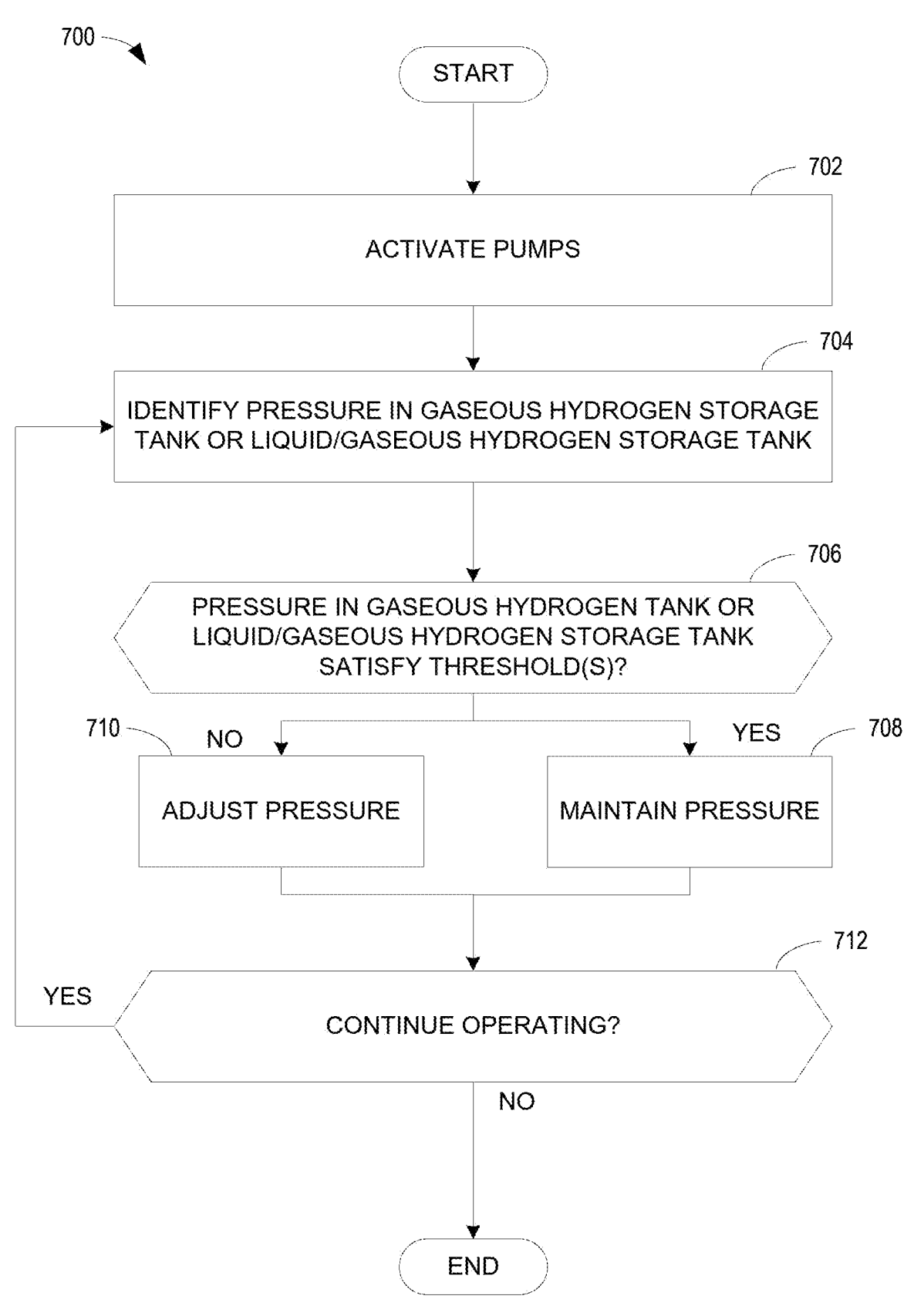
FIG. 7 is a flowchart representative of example machine readable instructions and/or example operations that may be executed, instantiated, and/or performed by example programmable circuitry to implement example pump control circuitry associated with the fuel circuits of FIGS. 3, 4, 5, and/or 6.
Figure 8:
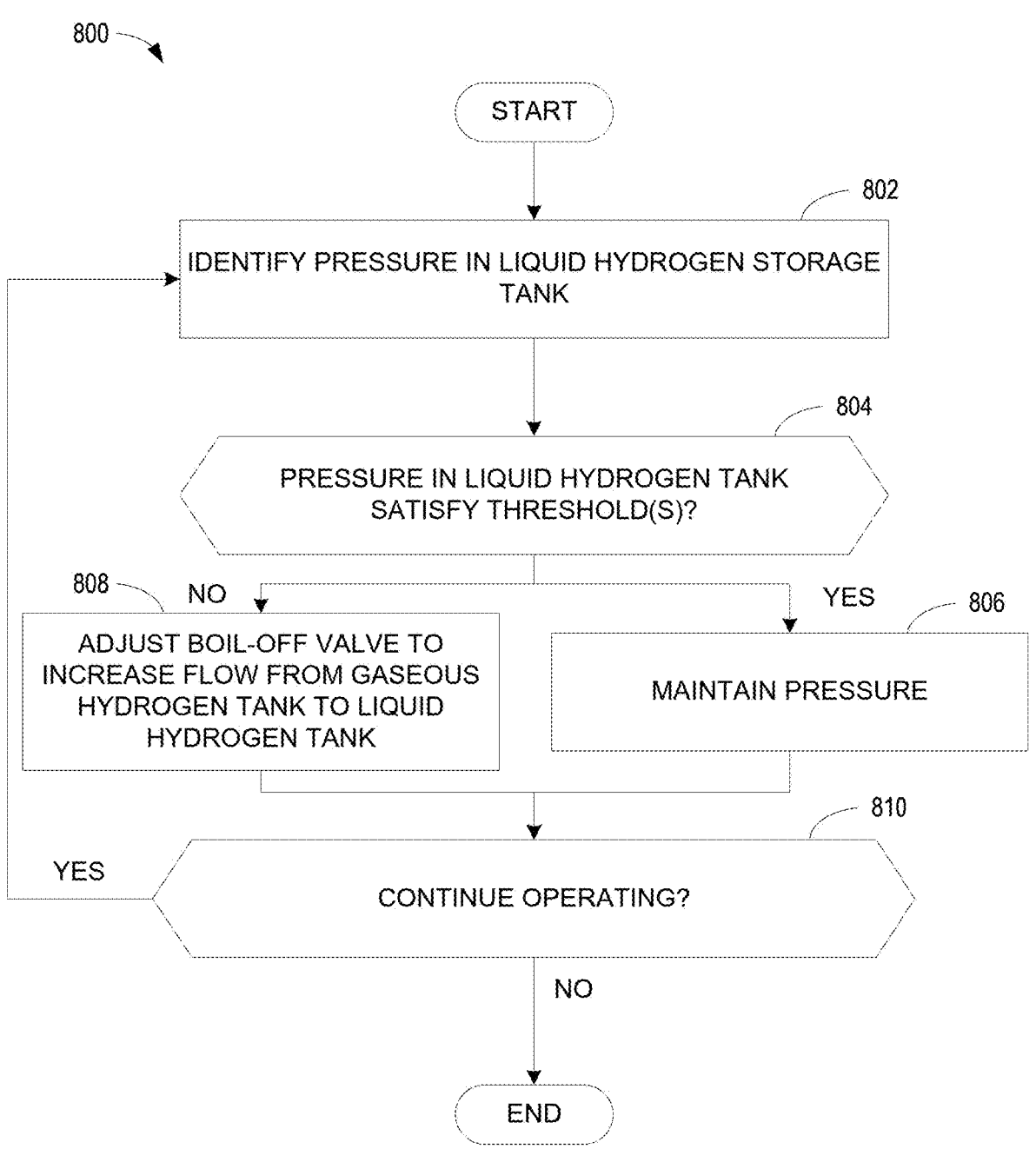
FIG. 8 is a flowchart representative of example machine readable instructions and/or example operations that may be executed, instantiated, and/or performed by example programmable circuitry to implement example boil-off control circuitry associated with the fuel circuits of FIGS. 3, 4, 5, and/or 6.
Figure 9:
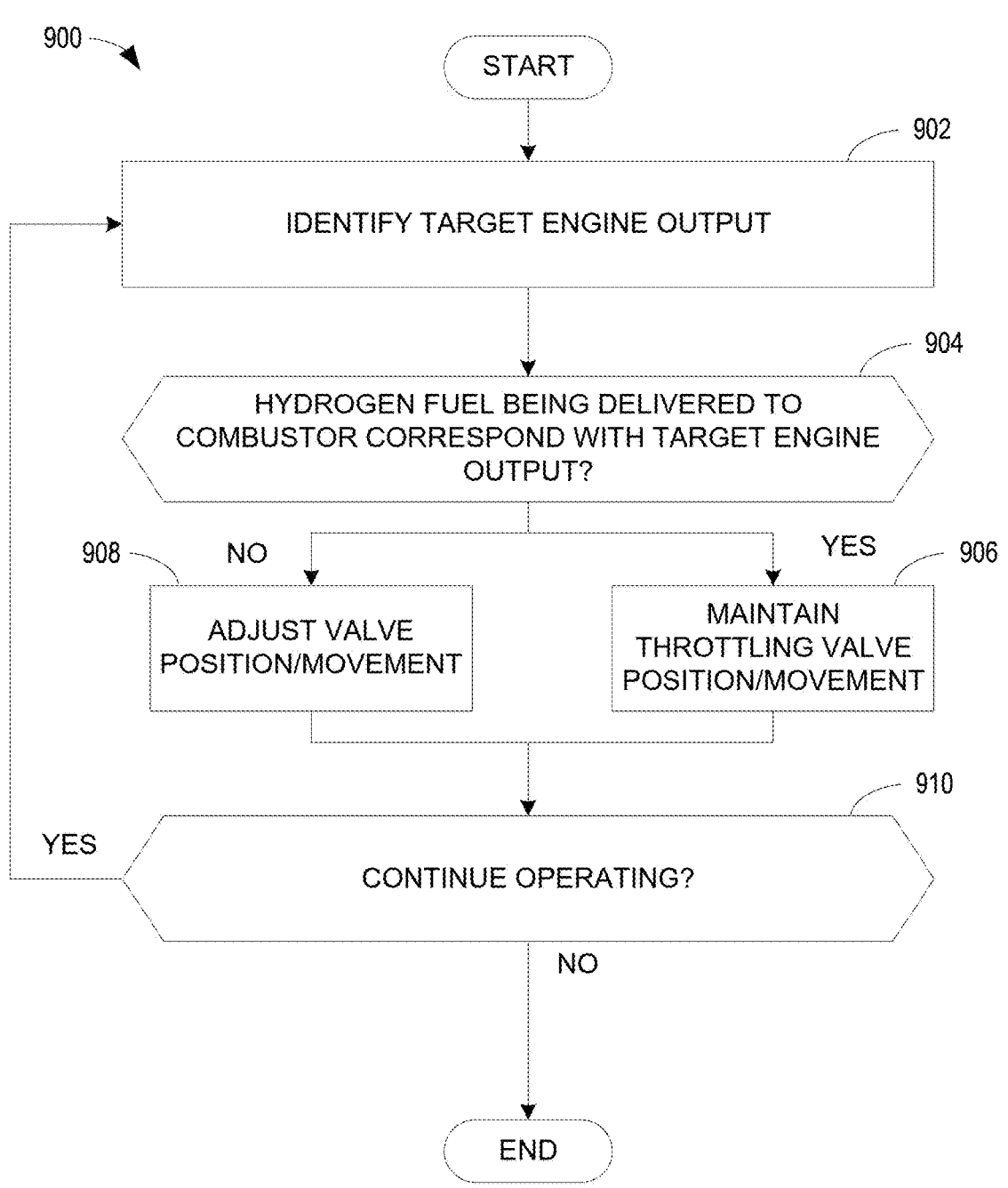
FIG. 9 is a flowchart representative of example machine readable instructions and/or example operations that may be executed, instantiated, and/or performed by example programmable circuitry to implement example fuel metering circuitry associated with the fuel circuits of FIGS. 3, 4, 5, and/or 6.

A flowchart representative of example machine readable instructions, which may be executed by programmable circuitry to implement and/or instantiate the pump control circuitry 348 of FIGS. 3, 4, 5, and 6 and/or representative of example operations which may be performed by programmable circuitry to implement and/or instantiate the pump control circuitry 348 of FIGS. 3, 4, 5, and 6, is shown in FIG. 7. A flowchart representative of example machine readable instructions, which may be executed by programmable circuitry to implement and/or instantiate the boil-off control circuitry 350 of FIGS. 3, 4, 5, and 6 and/or representative of example operations which may be performed by programmable circuitry to implement and/or instantiate the boil-off control circuitry 350 of FIGS. 3, 4, 5, and 6, is shown in FIG. 8. A flowchart representative of example machine readable instructions, which may be executed by programmable circuitry to implement and/or instantiate the fuel metering control circuitry 352 of FIGS. 3, 4, 5, and 6 and/or representative of example operations which may be performed by programmable circuitry to implement and/or instantiate the fuel metering control circuitry 352 of FIGS. 3, 4, 5, and 6, is shown in FIG. 9. The machine readable instructions may be one or more executable programs or portion(s) of one or more executable programs for execution by programmable circuitry such as the programmable circuitry 1012 shown in the example circuitry platform 1000 discussed below in connection with FIG. 10 and/or may be one or more function(s) or portion(s) of functions to be performed by the example programmable circuitry (e.g., an FPGA). In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flow-chart(s) illustrated in FIGS. 7, 8, and 9, many other methods of implementing the example pump control circuitry 348, the example boil-off control circuitry 350, and/or the example fuel metering control circuitry 352 may alterna-tively be used. For example, the order of execution of the blocks of the flowchart(s) may be changed, and/or some of the blocks described may be changed, eliminated, or com-bined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The pro-grammable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instruc-tions, code, representations of code, etc.) that may be utilized to create, manufacture, and/or produce machine executable instructions. For example, the machine readable instructions may be fragmented and stored on one or more storage devices, disks and/or computing devices (e.g., serv-ers) located at the same or different locations of a network or collection of networks (e.g., in the cloud, in edge devices, etc.). The machine readable instructions may require one or more of installation, modification, adaptation, updating, combining, supplementing, configuring, decryption, decom-pression, unpacking, distribution, reassignment, compila-tion, etc., in order to make them directly readable, interpre-table, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a pro-gram such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regard-less of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 7, 8, and 9 may be implemented using executable instructions (e.g., computer readable and/or machine readable instruc-tions) stored on one or more non-transitory computer read-able and/or machine readable media. As used herein, the terms non-transitory computer readable medium, non-tran-sitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory com-puter readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) sys-tems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 7 is a flowchart representative of example machine readable instructions and/or example operations 700 that may be executed, instantiated, and/or performed by pro-grammable circuitry to control a pressure of the hydrogen fuel in the gaseous phase in the gaseous hydrogen storage tank 310 (FIGS. 3-5) or the gaseous/liquid hydrogen storage tank 602 (FIG. 6). The example machine-readable instruc-tions and/or the example operations 700 of FIG. 7 begin at block 702, at which the pump control circuitry 348 (FIGS. 3-6) activates the LP pump 304 (FIGS. 3-6) and the HP pump 306 (FIGS. 3-6). For example, the pump control circuitry 348 can transmit a drive signal to an actuator of the LP pump 304 and the HP pump 306 to cause the hydrogen fuel in the liquid phase to be pulled out of the liquid hydrogen storage tank 302 and pressurized by the LP pump 304 and the HP pump 306.

At block 704, the pump control circuitry 348 identifies a pressure in the gaseous hydrogen storage tank 310 or the gaseous/liquid hydrogen storage tank 602. For example, the second sensor 346 (FIGS. 3-6) can measure a pressure in the gaseous hydrogen storage tank 310 and/or the gaseous/liquid hydrogen storage tank 602, and the pump control circuitry 348 can identify the pressure based on an input from the second sensor 346. In some examples, the pump control circuitry 348 determines that the pressure is approximately 2,000 psi. In some other examples, the pump control circuitry 348 determines that the pressure is approximately 200 psi.

At block 706, the pump control circuitry 348 determines whether a pressure in the gaseous hydrogen storage tank 310 or the gaseous/liquid hydrogen storage tank 602 satisfies one or more thresholds. In some examples, the pump control circuitry 348 determines whether the measured pressure satisfies (e.g., is greater than, is greater than or equal to) a pressure threshold (e.g., a minimum pressure threshold) and/or is within a predetermined range (e.g., between the minimum pressure threshold and a maximum pressure threshold). For example, the pump control circuitry 348 can determine the pressure threshold based on a predetermined pressure schedule, a predetermined pressure equation, a predetermined pressure table, and/or an engine pressure (e.g., a pressure in the combustor 314). In some examples, the predetermined range is based on a maximum working pressure associated with the combustor 314 (e.g., a pressure of the hydrogen fuel utilized for a maximum output of the gas turbine engine 26 (FIGS. 1 and 2)). In some such examples, the predetermined range can also be based on pressure losses that can be encountered in the conduits 315 between the gaseous hydrogen storage tank 310 or the gaseous/liquid hydrogen storage tank 602 and the combustor 314. For example, the predetermined range can be greater than the maximum working pressure such that pressure losses encountered in the conduits 315 reduces the pressure of the hydrogen fuel from the predetermined range to the maximum working pressure between the gaseous hydrogen storage tank 310 or the gaseous/liquid hydrogen storage tank 602 and the combustor 314. In some examples, the pressure threshold and/or the predetermined range corresponds to the operating stage of the gas turbine engine 26 (FIGS. 1 and 2). For example, the pressure threshold and/or the predetermined range can be a function of (i) a combustor pressure associated with a target engine output, plus (ii) pressure loss through the nozzles 312 (FIGS. 3-6), plus (iii) pressure losses through the fuel metering valve 340 and/or the throttling valve 342, plus (iv) pressure losses from the heat exchanger 308, and/or plus (v) pressure loss from the conduits 315 between the gaseous hydrogen storage tank 310 or the gaseous/liquid hydrogen storage tank 602 and the combustor 314. That is, the pressure of the fuel reduces (e.g., drops) between the gaseous hydrogen storage tank 310 or the gaseous/liquid hydrogen storage tank 602 and the combustor 314, and the pressure threshold associated with the gaseous hydrogen storage tank 310 or the gaseous/liquid hydrogen storage tank 602 accounts for this reduction. In some examples, the pressure threshold for a minimum engine output is approximately equivalent to ambient pressure. In some other examples, the pressure threshold for a maximum engine output is three times (3×) the combustor pressure associated with the maximum engine output. For example, the pressure threshold can be 2,000 psi. In some examples, when (i) the pressure threshold is associated with the maximum engine output and (ii) the pump control circuitry 348 determines that the pressure in the gaseous hydrogen storage tank 310 or the gaseous/liquid hydrogen storage tank 602 is 2,000 psi, the pump control circuitry 348 determines that the pressure is to be maintained. In other examples, when (i) the pressure threshold is associated with the maximum engine output and (ii) the pump control circuitry 348 determines that the pressure in the gaseous hydrogen storage tank 310 or the gaseous/liquid hydrogen storage tank 602 is 200 psi, the pump control circuitry 348 determines that the pressure threshold is to be adjusted. However, it should be understood that pressure thresholds are different for different engine types (e.g., turboprops versus turbofans, etc.), and the pump control circuitry 348 can be configured to set the pressure threshold(s) based on the associated engine. When the pressure in the gaseous hydrogen storage tank 310 or the gaseous/liquid hydrogen storage tank 602 satisfies the pressure threshold(s), the operations 700 proceed to block 708. Otherwise, when the pressure in the gaseous hydrogen storage tank 310 or the gaseous/liquid hydrogen storage tank 602 does not satisfy the pressure threshold(s), the operations 700 proceed to block 710.

At block 708, the pump control circuitry 348 maintains the pressure in the gaseous hydrogen storage tank 310 or the gaseous/liquid hydrogen storage tank 602. For example, when the pressure in the gaseous hydrogen storage tank 310 or the gaseous/liquid hydrogen storage tank 602 satisfies the pressure threshold(s), the pump control circuitry 348 causes the LP pump 304 and the HP pump 306 to maintain the pressure in the gaseous hydrogen storage tank 310. As such, when (i) the pressure threshold is associated with the maximum engine output and (ii) the pump control circuitry 348 determines that the pressure in the gaseous hydrogen storage tank 310 or the gaseous/liquid hydrogen storage tank 602 is approximately 2,000 psi, the pump control circuitry 348 can cause the LP pump 304 and/or the HP pump 306 to maintain the pressure. After block 708, the operations proceed to block 712.

At block 710, the pump control circuitry 348 adjusts pressure in the gaseous hydrogen storage tank 310 or the gaseous/liquid hydrogen storage tank 602. For example, when the pressure in the gaseous hydrogen storage tank 310 does not satisfy the pressure threshold(s), the pump control circuitry 348 causes the LP pump 304 and/or the HP pump 306 to adjust (e.g., increase or decrease) a pressure increase or decrease provided by the LP pump 304 and/or the HP pump 306 to adjust the pressure in the gaseous hydrogen storage tank 310 or the gaseous/liquid hydrogen storage tank 602. As such, when (i) the pressure threshold is associated with the maximum engine output and (ii) the pump control circuitry 348 determines that the pressure in the gaseous hydrogen storage tank 310 or the gaseous/liquid hydrogen storage tank 602 is approximately 200 psi, the pump control circuitry 348 can cause the LP pump 304 and/or the HP pump 306 to increase the pressure.

At block 712, the pump control circuitry 348 determines whether to continue operating. For example, the pump control circuitry 348 can continue operating when the gas turbine engine 26 and/or the aircraft 10 (FIG. 1) is still operating. When the pump control circuitry 348 determines that the gas turbine engine 26 and/or the aircraft 10 operations are to continue, the operations 700 return to block 704. Otherwise, the operations 700 terminate.

FIG. 8 is a flowchart representative of example machine readable instructions and/or example operations 800 that may be executed, instantiated, and/or performed by programmable circuitry to control a pressure of the hydrogen fuel in the liquid phase in the liquid hydrogen storage tank 302 (FIGS. 3-6) to prevent boil-off of the hydrogen fuel in the liquid hydrogen storage tank 302. The example machine-readable instructions and/or the example operations 800 of FIG. 8 begin at block 802, at which the boil-off control circuitry 350 (FIGS. 3-6) identifies a pressure in the liquid hydrogen storage tank 302. For example, the first sensor 344 can measure the pressure in the liquid hydrogen storage tank 302, and the boil-off control circuitry 350 can identify the pressure based on an input from the first sensor 344. In some examples, the pressure in the liquid hydrogen storage tank 302 is 0.5 bar. In some other examples, the pressure in the liquid hydrogen storage tank 302 is 5 bar.

At block 804, the boil-off control circuitry 350 determines whether the pressure in the liquid hydrogen storage tank 302 satisfies one or more pressure thresholds. For example, the boil-off control circuitry 350 can determine the pressure threshold(s) based on an initial pressure in the liquid hydrogen storage tank 302 when the liquid hydrogen storage tank 302 includes the hydrogen fuel mostly in the liquid phase. More particularly, the boil-off control circuitry 350 can determine that the pressure is to remain approximately constant within the liquid hydrogen storage tank 302. Accordingly, the boil-off control circuitry 350 can set a minimum pressure threshold to be a small margin less than the initial pressure (e.g., 1% of the initial pressure in bar less than the initial pressure) and set a maximum pressure threshold to be a small margin greater than the initial pressure (e.g., 1% of the initial pressure in bar greater than the initial pressure). The minimum pressure threshold is based on a configuration of the liquid hydrogen storage tank. For example, the minimum pressure threshold can be 1 bar, 5 bar, or any other pressure between 1-5 bar. Further, the boil-off control circuitry 350 can compare the pressure measured by the first sensor 344 to the pressure threshold(s). In some examples, when the pressure in liquid hydrogen storage tank 302 is 0.5 bar, the boil-off control circuitry 350 determines that the pressure threshold(s) is not satisfied. In some examples, when the pressure in liquid hydrogen storage tank 302 is 5 bar, the boil-off control circuitry 350 determines that the pressure threshold(s) is satisfied. When the measured pressure satisfies (e.g., is greater than or equal to, is greater than) the minimum pressure threshold and satisfies (e.g., is less than or equal to, is less than), the operations 800 proceed to block 806. Otherwise, when the measured pressure does not satisfy (e.g., is less than, is less than or equal to) the minimum pressure threshold or does not satisfy (e.g., is greater than, is greater than or equal to) the maximum pressure threshold, the operations 800 proceed to block 808.

At block 806, the boil-off control circuitry 350 maintains the pressure in the liquid hydrogen storage tank 302. For example, the boil-off control circuitry 350 can adjust or maintain a position of the boil-off valve 338 (FIGS. 3-6) to maintain the pressure in the liquid hydrogen storage tank 302. In some examples, the boil-off control circuitry 350 maintains the position of the boil-off valve 338 when the position will not increase or decrease the pressure in the liquid hydrogen storage tank 302. In some examples, the boil-off control circuitry 350 adjusts the position of the boil-off valve 338 to the position that will not increase or decrease the pressure in the liquid hydrogen storage tank

302 when the boil-off valve 338 is in a different position (e.g., when the position of the boil-off valve 338 was previously set to increase or decrease the pressure). For example, when the pressure in liquid hydrogen storage tank 302 is 5 bar, the boil-off control circuitry 350 can adjust or maintain the position of the boil-off valve 338 to prevent the pressure from dropping below the pressure threshold (e.g., below 5 bar).

At block 808, the boil-off control circuitry 350 adjusts the pressure in the liquid hydrogen storage tank 302. For example, when the pressure in the liquid hydrogen storage tank 302 does not satisfy the minimum pressure threshold, the boil-off control circuitry 350 can adjust the position of (e.g., further open) the boil-off valve 338 to increase the flow of the hydrogen fuel from the gaseous hydrogen storage tank 310 (FIGS. 3-5) (e.g., in the gaseous phase) or from the gaseous/liquid hydrogen storage tank 602 (FIG. 6) (e.g., in the gaseous and/or liquid phase) into the liquid hydrogen storage tank 302, which increases the pressure in the liquid hydrogen storage tank 302. Further, when the pressure in the liquid hydrogen storage tank 302 does not satisfy the maximum pressure threshold, the boil-off control circuitry 350 can adjust the position of (e.g., further close) the boil-off valve 338 to reduce the flow of the hydrogen fuel in the gaseous phase into the liquid hydrogen storage tank 302, which reduces the pressure in the liquid hydrogen storage tank 302. For example, when the pressure in liquid hydrogen storage tank 302 is 0.5 bar, the boil-off control circuitry 350 can adjust or maintain the position of the boil-off valve 338 to increase the pressure from above the pressure threshold (e.g., above 1 bar).

At block 810, the boil-off control circuitry 350 determines whether to continue operating. For example, the boil-off control circuitry 350 can continue operating when the gas turbine engine 26 and/or the aircraft 10 (FIG. 1) is still operating. When the boil-off control circuitry 350 determines that the gas turbine engine 26 and/or the aircraft 10 operations are to continue, the operations 800 return to block 802. Otherwise, the operations 800 terminate.

FIG. 9 is a flowchart representative of example machine readable instructions and/or example operations 900 that may be executed, instantiated, and/or performed by programmable circuitry to control a flow of the hydrogen fuel delivered to the combustor 314 (FIGS. 3-6) (e.g., the combustor 118 of FIG. 1). The example machine-readable instructions and/or the example operations 900 of FIG. 9 begin at block 902, at which the fuel metering control circuitry 352 (FIGS. 3-6) identifies a target engine output. For example, the fuel metering control circuitry 352 can identify the target engine output based on an input from an operator and/or an autopilot control system. In some examples, the fuel metering control circuitry 352 identifies a mass flow rate associated with the target engine output. For example, the mass flow rate can range from 10 pounds per hour (pph) to 17,000 pph. In some examples, the fuel metering control circuitry 352 a pressure difference between (i) the gaseous hydrogen storage tank 310 (FIGS. 3-5) or the gaseous/liquid hydrogen storage tank 602 (FIG. 6) and (ii) an output of the fuel metering valve 340 (FIGS. 3-6) that corresponds with the mass flow rate associated with the target engine output based on a predetermined relationship between the mass flow rate and the pressure difference. For example, the mass flow rate associated with the target engine output can be 1,000 pph, and the fuel metering control circuitry 352 can identify the pressure difference that corresponds with the 1,000 pph mass flow rate.

At block 904, the fuel metering control circuitry 352 determines whether the hydrogen fuel being delivered to the combustor corresponds with the target engine output. In some examples (e.g., in the fuel systems 300, 400, 600 of FIGS. 3-4 and 6), the fuel metering control circuitry 352 determines whether the throttling valve 342 (FIGS. 3-4 and 6) is moving (e.g., oscillating) at a predetermined rate that corresponds with the identified pressure difference across the fuel metering valve 340 associated with the target engine output. In some examples (e.g., in the fuel system 500 of FIG. 5), the fuel metering control circuitry 352 determines whether the hydrogen fuel being delivered to the combustor 314 corresponds with the target engine output based on the pressure difference between the gaseous hydrogen storage tank 310 and the output of the fuel metering valve 340. In some examples, when (i) the target engine output is associated with the mass flow rate of 1,000 pph and (ii) the pressure difference is one that corresponds with the 1,000 pph mass flow rate, the fuel metering control circuitry 352 determines that the hydrogen fuel being delivered to the combustor corresponds with the target engine output. In some examples, when (i) the target engine output is associated with the mass flow rate of 1,000 pph and (ii) the pressure difference is one that does not correspond with the 1,000 pph mass flow rate, the fuel metering control circuitry 352 determines that the hydrogen fuel being delivered to the combustor does not correspond with the target engine output. When the hydrogen fuel being delivered to the combustor 314 corresponds with the target engine output, the operations 900 proceed to block 906. Otherwise, when the hydrogen fuel being delivered to the combustor 314 does not correspond with the target engine output, the operations 900 proceed to block 908.

At block 906, the fuel metering control circuitry 352 maintains a movement (e.g., an oscillation) of the throttling valve 342 and/or a movement or position of the fuel metering valve 340. For example, when (i) the target engine output is associated with the mass flow rate of 1,000 pph and (ii) the pressure difference is one that corresponds with the 1,000 pph mass flow rate, the fuel metering control circuitry 352 can maintain the movement of the throttling valve 342 and/or the movement or position of the fuel metering valve 340. After block 906 the operations 900 proceed to block 910.

At block 908, the fuel metering control circuitry 352 adjusts the movement of the throttling valve 342 and/or the movement or position of the fuel metering valve 340. For example, when (i) the target engine output is associated with the mass flow rate of 1,000 pph and (ii) the pressure difference is one that does not correspond with the 1,000 pph mass flow rate, the fuel metering control circuitry 352 can adjust the movement of the throttling valve 342 and/or the movement or position of the fuel metering valve 340. In some examples, the fuel metering control circuitry 352 identifies a predetermined position and/or movement of the throttling valve 342 associated with the target engine output. In some examples, the fuel metering control circuitry 352 calculates a position to be implemented by the fuel metering valve 340 based on the pressure differential between the gaseous hydrogen storage tank 310 and the combustor 314. In such examples, the fuel metering control circuitry 352 calculates the position to be implemented by the fuel metering valve 340 based on a first pressure input from the second sensor 346 (FIGS. 3-6) and a second pressure input from the third sensor 502 (FIG. 5). In some examples, the fuel metering control circuitry 352 is configured to automatically implement the position based on the measured pressure differential and/or the target engine output (e.g., a difference between the measured pressure differential and the target engine output).

At block 910, the fuel metering control circuitry 352 determines whether to continue operating. For example, the fuel metering control circuitry 352 can continue operating when the gas turbine engine 26 and/or the aircraft 10 (FIG. 1) is still operating. When the fuel metering control circuitry 352 determines that the gas turbine engine 26 and/or the aircraft 10 operations are to continue, the operations 900 return to block 902. Otherwise, the operations 900 terminate.

Figure 10:
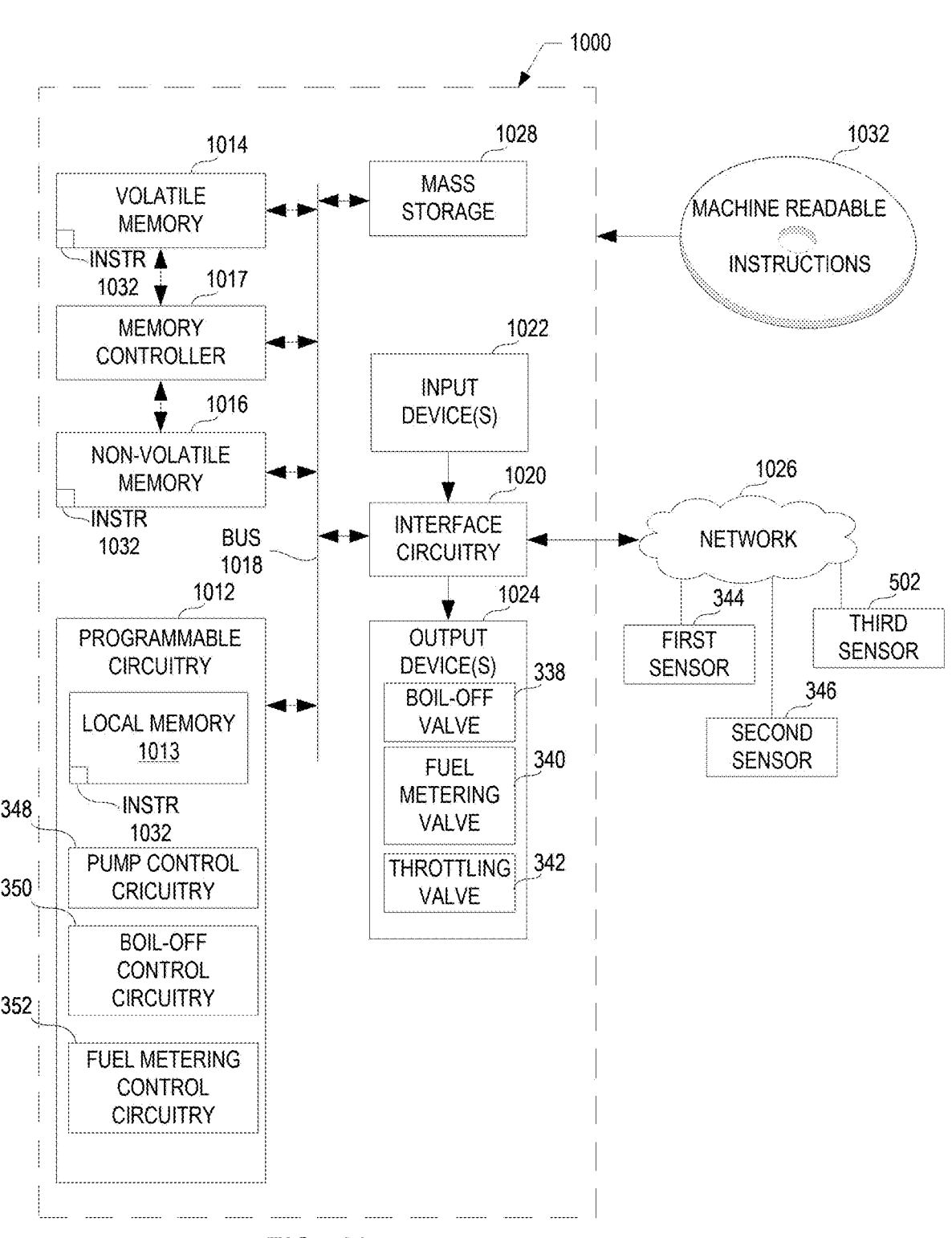
FIG. 10 is a block diagram of an example processing platform including programmable circuitry structured to execute, instantiate, and/or perform the example machine readable instructions and/or perform the example operations of FIGS. 7-9 to implement the programmable circuitry of FIGS. 3, 4, 5, and/or 6.

FIG. 10 is a block diagram of an example programmable circuitry platform 1000 structured to execute and/or instantiate the example machine-readable instructions and/or the example operations of FIGS. 7, 8, and 9 to implement the pump control circuitry 348, the boil-off control circuitry 350, and the fuel metering control circuitry 352 of FIGS. 3, 4, 5, and 6. The programmable circuitry platform 1000 can be, for example, a digital computer (e.g., a Full Authority Digital Engine Control (FADEC)) or any other type of computing and/or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, and/or microcontrollers from any desired family or manufacturer. The programmable circuitry 1012 may be implemented by one or more semiconductor based (e.g., silicon based) devices. In this example, the programmable circuitry 1012 implements the pump control circuitry 348, the boil-off control circuitry 350, and the fuel metering control circuitry 352.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user (e.g., a human user, a machine user, etc.) to enter data and/or commands into the programmable circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output device(s) 1024 can be implemented, for example, by a motor and/or another actuator (e.g., a valve actuator, a pump actuator, etc.). In this example, the output device(s) 1024 implement the boil-off valve 338, the fuel metering valve 340, and the throttling valve 342. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc. In this example, the network 1026 is in communication with the first sensor 344, the second sensor 346, and the third sensor 502. In some examples, the network 1026 is in communication with the boil-off valve 338, the fuel metering valve 340, and the throttling valve 342.

The programmable circuitry platform 1000 of the illustrated example also includes one or more mass storage discs or devices 1028 to store firmware, software, and/or data. Examples of such mass storage discs or devices 1028 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

Machine readable instructions 1032, which may be implemented by the machine readable instructions of FIGS. 7-9, may be stored in the mass storage device 1028, in the volatile memory 1014, in the non-volatile memory 1016, and/or on at least one non-transitory computer readable storage medium such as a CD or DVD which may be removable.

From the foregoing, it will be appreciated that example systems, apparatus, articles of manufacture, and methods have been disclosed that decouple a fuel pumping portion of a fuel system from a fuel metering portion of the fuel system. As such, examples disclosed herein remove issues that may otherwise arise from a lack of synchronization between the fuel pumping portion and the fuel metering portion. Additionally, examples disclosed herein enable a pressure in a liquid hydrogen storage tank to be maintained with relatively simple pumps (e.g., pumps that include a single outlet). Further, examples disclosed herein reduce fluctuations in the flow of hydrogen fuel to a combustor. Specifically, the gaseous hydrogen storage tank disclosed herein serves as a damper against fluctuations in the fluid flow that would otherwise result from the pumping. As a result, the gaseous hydrogen storage tank disclosed herein enables negative displacement pumps (e.g., piston pumps) to be utilized to pump the hydrogen fuel. The gaseous hydrogen storage tank also damps (e.g., reduces) temperature fluctuations in the hydrogen fuel by enabling the hydrogen fuel in the gaseous phase flowing to the combustor to be formed from a mixture of hydrogen fuel that has been pressurized and heated at different times to different temperatures. Examples disclosed herein also simplify controls that are responsive to and cause implementation of a target engine output. For example, by maintaining the gaseous hydrogen storage tank at a predetermined pressure (e.g., an approximately constant pressure), the target for the fuel pumping portion of the fuel system can remain constant despite changes in the target engine output.

Example multi-phase fluid fuel systems and related methods are disclosed. Further aspects are provided by the subject matter of the following clauses:

A fuel system comprising a liquid hydrogen storage tank to include hydrogen fuel in a liquid phase, and an at least one of gaseous or liquid hydrogen storage tank to include the hydrogen fuel in at least one of a gaseous phase or the liquid phase, a first portion of the hydrogen fuel in at least one of the gaseous phase or the liquid phase to exit the at least one of gaseous or liquid hydrogen storage tank and flow to a combustor of an engine, a second portion of the hydrogen fuel in at least one of the gaseous phase or the liquid phase to exit the at least one of gaseous or liquid hydrogen storage tank and flow to the liquid hydrogen storage tank.

The fuel system of any preceding example, further including a pump to increase a pressure of the hydrogen fuel moving from the liquid hydrogen storage tank to the at least one of gaseous or liquid hydrogen storage tank, and a heat exchanger to increase a temperature of the hydrogen fuel moving from the liquid hydrogen storage tank to the at least one of gaseous or liquid hydrogen storage tank.

The fuel system of any preceding example, further including programmable circuitry to cause the pump to maintain a pressure in the at least one of gaseous or liquid hydrogen storage tank within a range.

The fuel system of any preceding example, wherein the range is independent of a target output of the engine.

The fuel system of any preceding example, wherein the range is based on a target output of the engine.

The fuel system of any preceding example, wherein the pump is a first pump that includes a single outlet, the fuel system further including a second pump to further increase the pressure of the hydrogen fuel moving from the liquid hydrogen storage tank to the at least one of gaseous or liquid hydrogen storage tank, and wherein the second pump includes a single outlet.

The fuel system of any preceding example, further including a valve positioned downstream of the at least one of gaseous or liquid hydrogen storage tank and upstream of the combustor, and programmable circuitry to control a position of the valve based on a target output for the engine.

The fuel system of any preceding example, further including a valve positioned between the at least one of gaseous or liquid hydrogen storage tank and the liquid hydrogen storage tank, a position of the valve to control a flow rate of the hydrogen fuel from the at least one of gaseous or liquid hydrogen storage tank to the liquid hydrogen storage tank, and programmable circuitry to control the position of the valve based on a pressure in the liquid hydrogen storage tank.

The fuel system of any preceding example, further including a pump to increase a pressure of the hydrogen fuel moving from the liquid hydrogen storage tank to the at least one of gaseous or liquid hydrogen storage tank, and a heat exchanger to increase a temperature of the first portion of the hydrogen fuel moving from the gaseous hydrogen storage tank to the combustor.

A fuel system comprising a combustor of a gas turbine engine, a liquid hydrogen storage tank to include hydrogen fuel in a liquid phase, and a gaseous hydrogen storage tank to include the hydrogen fuel in a gaseous phase, the gaseous hydrogen storage tank positioned between the liquid hydrogen storage tank and the combustor in a flow path for the hydrogen fuel.

The fuel system of any preceding example, wherein a first portion of the hydrogen fuel in at least one of the gaseous phase or the liquid phase exits a first outlet of the at least one of gaseous or liquid hydrogen storage tank flows to the combustor, and wherein a second portion of the hydrogen fuel in at least one of the gaseous phase or the liquid phase exits a second outlet of the at least one of gaseous or liquid hydrogen storage tank and flows to the liquid hydrogen storage tank.

The fuel system of any preceding example, wherein the at least one of gaseous or liquid hydrogen storage tank is a gaseous hydrogen storage tank, further including a pump to increase a pressure of the hydrogen fuel moving from the liquid hydrogen storage tank to the gaseous hydrogen storage tank, and a heat exchanger to increase a temperature of the hydrogen fuel moving from the liquid hydrogen storage tank to the gaseous hydrogen fuel tank.

The fuel system of any preceding example, further including a pump to increase a pressure of the hydrogen fuel moving from the liquid hydrogen storage tank to the at least one of gaseous or liquid hydrogen storage tank, and programmable circuitry to cause the pump to maintain a pressure in the at least one of gaseous or liquid hydrogen storage tank within a range.

The fuel system of any preceding example, wherein the range is independent of a target output of the gas turbine engine.

The fuel system of any preceding example, wherein the pump is a first pump including a single outlet, further including a second pump to increase the pressure of the hydrogen fuel moving from the liquid hydrogen storage tank to the at least one of gaseous or liquid hydrogen storage tank, the second pump including a single outlet.

The fuel system of any preceding example, further including a valve positioned downstream of the at least one of gaseous or liquid hydrogen storage tank and upstream of the combustor, and programmable circuitry to control a position of the valve based on a target output for the gas turbine engine.

The fuel system of any preceding example, further including a valve positioned between the at least one of gaseous or liquid hydrogen storage tank and the liquid hydrogen storage tank, a position of the valve to control a flow rate of the hydrogen fuel from the at least one of gaseous or liquid hydrogen storage tank to the liquid hydrogen storage tank, and programmable circuitry to control the position of the valve based on a pressure in the liquid hydrogen storage tank.

A fuel system comprising a gas turbine engine, a liquid hydrogen storage tank to hold hydrogen fuel in a liquid phase, an at least one of gaseous or liquid hydrogen storage tank to hold the hydrogen fuel in at least one of a gaseous phase or the liquid phase, a pump to pressurize the hydrogen fuel flowing from the liquid hydrogen storage tank to the at least one of gaseous or liquid hydrogen storage tank, and programmable circuitry operatively coupled to the pump, the programmable circuitry to cause the pump to maintain a pressure in the at least one of gaseous or liquid hydrogen storage tank within a constant pressure range throughout operations associated with the gas turbine engine.

The fuel system of any preceding example, further including a nozzle, and wherein the gas turbine engine includes a combustor, the nozzle to inject the hydrogen fuel in the gaseous phase into the combustor, and wherein the at least one of gaseous or liquid hydrogen storage tank is positioned between the liquid hydrogen storage tank and the nozzle in a hydrogen fuel flow path.

The fuel system of any preceding example, wherein the programmable circuitry is first programmable circuitry, further including second programmable circuitry to control a flow of the hydrogen fuel from the at least one of gaseous or liquid hydrogen storage tank to the nozzle based on the operations associated with the gas turbine engine.

The fuel system of any preceding example, wherein the programmable circuitry is first programmable circuitry, wherein the pressure in the at least one of gaseous or liquid hydrogen storage tank is a first pressure, and further including second programmable circuitry and a valve, wherein a position of the valve corresponds with a flow of the hydrogen fuel from the at least one of gaseous or liquid hydrogen storage tank to the liquid hydrogen storage tank, the second programmable circuitry to control the position of the valve based on a second pressure in the liquid hydrogen storage tank.

The fuel system of any preceding example, wherein the operations associated with the gas turbine engine include more than one power output of the gas turbine engine or more than one speed output of the gas turbine engine.

A fuel system comprising means for injecting hydrogen fuel into a combustor of an engine, first means for holding hydrogen fuel in a liquid phase, second means for holding the hydrogen fuel in at least one of a gaseous phase or a liquid phase, and means for pressurizing the hydrogen fuel flowing from the first means for holding to the second means for holding, the means for pressurizing to maintain a pressure in the second means for holding within a constant pressure range throughout operations associated with the engine.

The fuel system of any preceding example, wherein the second means for holding is positioned between the first means for holding and the means for injecting in a hydrogen fuel flow path.

The fuel system of any preceding example, further including means for controlling a flow of the hydrogen fuel from the second means for holding to the means for injecting based on the operations associated with the engine.

The fuel system of any preceding example, wherein the pressure in the second means for holding is a first pressure, further including means for controlling a flow of the hydrogen fuel from the second means for holding to the first means for holding based on a second pressure in the first means for holding.

The fuel system of any preceding example, wherein the operations associated with the engine include more than one power output of the engine or more than one speed output of the engine.

A method comprising identifying a pressure in an at least one of gaseous or liquid hydrogen storage tank that holds hydrogen fuel in at least one of a gaseous phase or a liquid phase, the hydrogen fuel to be injected into a combustor of a gas turbine engine, determining whether the pressure satisfies a threshold, wherein the threshold is independent of a target output for the gas turbine engine, when the pressure satisfies the threshold, causing a pump to maintain the pressure, and when the pressure does not satisfy the threshold, causing the pump to adjust the pressure.

The method of any preceding example, wherein the threshold is based on a maximum working pressure associated with a combustor of the gas turbine engine.

The method of any preceding example, wherein the threshold is greater than a maximum working pressure associated with a combustor of the gas turbine engine.

The method of any preceding example, further including pumping the hydrogen fuel from a liquid hydrogen storage tank to the at least one of gaseous or liquid hydrogen storage tank.

The method of any preceding example, wherein the hydrogen fuel is in a liquid phase when entering the pump.

The method of any preceding example, wherein the at least one of gaseous or liquid hydrogen storage tank is a gaseous hydrogen storage tank, further including heating the hydrogen fuel between the pump and the gaseous hydrogen storage tank.

The method of any preceding example, wherein the pressure is a first pressure, further including controlling a flow of the hydrogen fuel from the at least one of gaseous or liquid hydrogen storage tank to the liquid hydrogen storage tank based on a second pressure in the liquid hydrogen storage tank.

The method of any preceding example, further including controlling a valve downstream of the at least one of gaseous or liquid hydrogen storage tank based on the target output of the engine.

A fuel system comprising interface circuitry, machine readable instructions, and programmable circuitry to at least one of instantiate or execute the machine readable instructions to identify a pressure in a at least one of gaseous or liquid hydrogen storage tank that holds hydrogen fuel in at least one of a gaseous phase or a liquid phase, the hydrogen fuel to be injected into a combustor of a gas turbine engine, determine whether the pressure satisfies a threshold, wherein the threshold is independent of a target output for the gas turbine engine, when the pressure satisfies the threshold, cause a pump to maintain the pressure, and when the pressure does not satisfy the threshold, cause the pump to adjust the pressure.

The fuel system of any preceding example, wherein the threshold is based on a maximum working pressure associated with a combustor of the gas turbine engine.

The fuel system of any preceding example, wherein the threshold is greater than a maximum working pressure associated with a combustor of the gas turbine engine.

The fuel system of any preceding example, wherein the programmable circuitry is to cause the hydrogen fuel to be pumped from a liquid hydrogen storage tank to the at least one of gaseous or liquid hydrogen storage tank.

The fuel system of any preceding example, wherein the at least one of gaseous or liquid hydrogen storage tank is a gaseous hydrogen storage tank, and wherein the programmable circuitry is to cause the hydrogen fuel to receive thermal energy between the pump and the gaseous hydrogen storage tank.

The fuel system of any preceding example, wherein the pressure is a first pressure, wherein the programmable circuitry is to control a flow of the hydrogen fuel from the at least one of gaseous or liquid hydrogen storage tank to the liquid hydrogen storage tank based on a second pressure in the liquid hydrogen storage tank.

The fuel system of any preceding example, wherein the programmable circuitry is to control a valve downstream of the at least one of gaseous or liquid hydrogen storage tank based on the target output of the engine.

A method comprising identifying a pressure in a liquid hydrogen storage tank that holds hydrogen fuel in a liquid phase, the hydrogen fuel to be injected into a combustor of a gas turbine engine, determining whether the pressure satisfies one or more pressure thresholds, when pressure does not satisfy the one or more pressure thresholds, adjusting a position of a valve that controls a flow rate of the hydrogen fuel in at least one of a gaseous phase or a liquid phase from an at least one of gaseous or liquid hydrogen storage tank to the liquid hydrogen storage tank to adjust the pressure, and when the pressure satisfies the one or more pressure thresholds, causing the position of the valve to be maintained or adjusted to maintain the pressure.

The method of any preceding example, wherein the one or more pressure thresholds are based on a constant pressure range within which the pressure of the hydrogen fuel in the liquid hydrogen storage tank is to be maintained.

The method of any preceding example, wherein the one or more pressure thresholds are based on a starting pressure in the liquid hydrogen storage tank.

The method of any preceding example, wherein the pressure is a first pressure, further including causing a second pressure in the at least one of gaseous or liquid hydrogen storage tank to satisfy a pressure threshold.

The method of any preceding example, wherein causing the second pressure in the at least one of gaseous or liquid hydrogen storage tank to satisfy the pressure threshold includes controlling one or more pumps that increase a pressure of the hydrogen fuel flowing from the liquid hydrogen storage tank to the at least one of gaseous or liquid hydrogen storage tank.

The method of any preceding example, wherein the pressure threshold is independent of a target output for the gas turbine engine.

The method of any preceding example, further including controlling a valve downstream of the at least one of gaseous or liquid hydrogen storage tank based on the target output of the engine.

A fuel system comprising interface circuitry, machine readable instructions, and programmable circuitry to at least one of instantiate or execute the machine readable instructions to identify a pressure in a liquid hydrogen storage tank that holds hydrogen fuel in a liquid phase, the hydrogen fuel to be injected into a combustor of a gas turbine engine, determine whether the pressure satisfies one or more pressure thresholds, when pressure does not satisfy the one or more pressure thresholds, adjust a position of a valve that controls a flow rate of the hydrogen fuel in at least one of a gaseous phase or the liquid phase from an at least one of gaseous or liquid hydrogen storage tank to the liquid hydrogen storage tank to adjust the pressure, and when the pressure satisfies the one or more pressure thresholds, cause the position of the valve to be maintained or adjusted to maintain the pressure.

The fuel system of any preceding example, wherein the one or more pressure thresholds are based on a constant pressure range within which the pressure of the hydrogen fuel in the liquid hydrogen storage tank is to be maintained.

The fuel system of any preceding example, wherein the one or more pressure thresholds are based on a starting pressure in the liquid hydrogen storage tank.

The fuel system of any preceding example, wherein the pressure is a first pressure, wherein the programmable circuitry is to cause a second pressure in the at least one of gaseous or liquid hydrogen storage tank to satisfy a pressure threshold.

The fuel system of any preceding example, wherein the programmable circuitry is to control one or more pumps that increase a pressure of the hydrogen fuel flowing from the liquid hydrogen storage tank to the at least one of gaseous or liquid hydrogen storage tank.

The fuel system of any preceding example, wherein the pressure threshold is independent of a target output for the gas turbine engine.

The fuel system of any preceding example, wherein the programmable circuitry is to control a valve downstream of the at least one of gaseous or liquid hydrogen storage tank based on the target output of the engine.

A method comprising identifying a target engine output, determining whether a pressure or a flow rate of hydrogen fuel in a gaseous phase being delivered to a combustor corresponds with the target engine output, when the pressure or the flow rate does not correspond with the target engine output, causing a valve between an at least one of gaseous or liquid hydrogen storage tank and the combustor to adjust the pressure or the flow rate, when the pressure or the flow rate corresponds with the target engine output, causing the valve to maintain the pressure or the flow rate.

The method of any preceding example, wherein the pressure is a first pressure, further including controlling a second pressure of the hydrogen fuel in the at least one of gaseous or liquid hydrogen storage tank based on the target engine output.

The method of any preceding example, wherein the pressure is a first pressure, further including controlling a second pressure of the hydrogen fuel in the at least one of gaseous or liquid hydrogen storage tank independent of the target engine output.

The method of any preceding example, wherein the pressure is a first pressure, further including controlling a flow of the hydrogen fuel from the at least one of gaseous or liquid hydrogen storage tank to a liquid hydrogen storage tank based on a second pressure in the liquid hydrogen storage tank.

The method of any preceding example, further including controlling a pressure increase that the hydrogen fuel flowing from the liquid hydrogen storage tank to the at least one of gaseous or liquid hydrogen storage tank receives based on a third pressure in the at least one of gaseous or liquid hydrogen storage tank.

A fuel system comprising interface circuitry, machine readable instructions, and programmable circuitry to at least one of instantiate or execute the machine readable instructions to identify a target engine output, determine whether a pressure or a flow rate of hydrogen fuel in a gaseous phase being delivered to a combustor corresponds with the target engine output, when the pressure or the flow rate does not correspond with the target engine output, cause a valve between an at least one of gaseous or liquid hydrogen storage tank and the combustor to adjust the pressure or the flow rate, when the pressure or the flow rate corresponds with the target engine output, cause the valve to maintain the pressure or the flow rate.

The fuel system of any preceding example, wherein the pressure is a first pressure, wherein the programmable circuitry is to control a second pressure of the hydrogen fuel in the at least one of gaseous or liquid hydrogen storage tank based on the target engine output.

The fuel system of any preceding example, wherein the pressure is a first pressure, wherein the programmable circuitry is to control a second pressure of the hydrogen fuel in the at least one of gaseous or liquid hydrogen storage tank independent of the target engine output.

The fuel system of any preceding example, wherein the pressure is a first pressure, wherein the programmable circuitry is to control a flow of the hydrogen fuel from the at least one of gaseous or liquid hydrogen storage tank to a liquid hydrogen storage tank based on a second pressure in the liquid hydrogen storage tank.

The fuel system of any preceding example, wherein the programmable circuitry is to control a pressure increase that the hydrogen fuel flowing from the liquid hydrogen storage tank to the at least one of gaseous or liquid hydrogen storage tank receives based on a third pressure in the at least one of gaseous or liquid hydrogen storage tank.

A method comprising pumping hydrogen fuel in a liquid phase from a first storage tank to a second storage tank, transporting a first portion of the hydrogen fuel from the second storage tank to a combustor of an engine, and transporting a second portion of the hydrogen fuel from the second storage tank to the first storage tank.

The method of any preceding example, further including heating the hydrogen fuel between the first storage tank and the second storage tank.

The method of any preceding example, further including heating the hydrogen fuel between the second storage tank and the combustor.

The method of any preceding example, further including controlling a position of a boil-off valve that controls a flow rate of the hydrogen fuel from the second storage tank to the first storage tank based on a pressure in the first storage tank and a starting pressure in the first storage tank.

The method of any preceding example, further including controlling a pressure change provided by the pumping between the first storage tank and the second storage tank based on a pressure in the second storage tank.

The method of any preceding example, further including controlling the pressure change provided by the pumping between the first storage tank and the second storage tank based on a target engine output.

A fuel system comprising a liquid storage tank to include fuel in a liquid phase, a gaseous/liquid storage tank to include the fuel in at least one of a gaseous phase or the liquid phase, at least one pump to pump the fuel in the liquid phase to the gaseous/liquid storage tank, a combustor, and a heat exchanger to heat the fuel between the combustor and the gaseous/liquid storage tank.

The fuel system of any preceding example, wherein a first portion of the fuel in the gaseous/liquid storage tank flows to the heat exchanger, and wherein a second portion of the fuel in the gaseous/liquid storage tank flows to the liquid storage tank.

The foregoing examples of fuel systems can be used with aircraft engines. Although each example fuel system disclosed above has certain features, it should be understood that it is not necessary for a particular feature of one example fuel system to be used exclusively with that fuel system. Instead, any of the features described above and/or depicted in the drawings can be combined with any of the fuel systems, in addition to or in substitution for any of the other features of those fuel systems. That is, features of one fuel system are not mutually exclusive to features of another fuel system. Instead, the scope of this disclosure encompasses any combination of any of the features.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A fuel system comprising:

a liquid hydrogen storage tank to include hydrogen fuel in a liquid phase;

an at least one of gaseous or liquid hydrogen storage tank to include the hydrogen fuel in at least one of a gaseous phase or the liquid phase, a first portion of the hydrogen fuel in at least one of the gaseous phase or the liquid phase to exit the at least one of gaseous or liquid hydrogen storage tank and flow to a combustor of an engine, a second portion of the hydrogen fuel in at least one of the gaseous phase or the liquid phase to exit the at least one of gaseous or liquid hydrogen storage tank and flow to the liquid hydrogen storage tank;

a pump to increase a pressure of the hydrogen fuel moving from the liquid hydrogen storage tank to the at least one of gaseous or liquid hydrogen storage tank; and programmable circuitry to cause the pump to maintain a pressure in the at least one of gaseous or liquid hydrogen storage tank to be approximately constant.

2. The fuel system of claim 1, further including:

a heat exchanger to increase a temperature of the hydrogen fuel moving from the liquid hydrogen storage tank to the at least one of gaseous or liquid hydrogen storage tank.

3. The fuel system of claim 1, wherein the pressure is independent of a target output of the engine.

4. The fuel system of claim 1, wherein the pump is a first pump that includes a single outlet, the fuel system further including a second pump to further increase the pressure of the hydrogen fuel moving from the liquid hydrogen storage tank to the at least one of gaseous or liquid hydrogen storage tank, and wherein the second pump includes a single outlet.

5. The fuel system of claim 1, further including:

a valve positioned downstream of the at least one of gaseous or liquid hydrogen storage tank and upstream of the combustor; and programmable circuitry to control a position or a movement of the valve based on a target output for the engine.

6. The fuel system of claim 1, further including:

a valve positioned between the at least one of gaseous or liquid hydrogen storage tank and the liquid hydrogen storage tank, a position of the valve to control a flow rate of the hydrogen fuel from the at least one of gaseous or liquid hydrogen storage tank to the liquid hydrogen storage tank; and programmable circuitry to control the position of the valve based on a pressure in the liquid hydrogen storage tank.

7. A fuel system comprising:

a combustor of a gas turbine engine;

a liquid hydrogen storage tank to include hydrogen fuel in a liquid phase; and an at least one of gaseous or liquid hydrogen storage tank to include the hydrogen fuel in at least one of a gaseous phase or the liquid phase, the at least one of gaseous or liquid hydrogen storage tank positioned between the liquid hydrogen storage tank and the combustor in a flow path for the hydrogen fuel;

a valve positioned between the at least one of gaseous or liquid hydrogen storage tank and the liquid hydrogen storage tank, a position of the valve to control a flow rate of the hydrogen fuel from the at least one of gaseous or liquid hydrogen storage tank to the liquid hydrogen storage tank; and programmable circuitry to control the position of the valve based on a pressure measured in the liquid hydrogen storage tank.

8. The fuel system of claim 7, wherein a first portion of the hydrogen fuel in at least one of the gaseous phase or the liquid phase exits a first outlet of the at least one of gaseous or liquid hydrogen storage tank flows to the combustor, and wherein a second portion of the hydrogen fuel in at least one of the gaseous phase or the liquid phase exits a second outlet of the at least one of gaseous or liquid hydrogen storage tank and flows to the liquid hydrogen storage tank.

9. The fuel system of claim 7, wherein the at least one of gaseous or liquid hydrogen storage tank is a gaseous hydrogen storage tank, further including:

a pump to increase a pressure of the hydrogen fuel moving from the liquid hydrogen storage tank to the gaseous hydrogen storage tank; and a heat exchanger to increase a temperature of the hydrogen fuel moving from the liquid hydrogen storage tank to the gaseous hydrogen storage tank.

10. The fuel system of claim 7, further including:

a pump to increase a pressure of the hydrogen fuel moving from the liquid hydrogen storage tank to the at least one of gaseous or liquid hydrogen storage tank; and programmable circuitry to cause the pump to maintain a pressure in the at least one of gaseous or liquid hydrogen storage tank within a range.

11. The fuel system of claim 10, wherein the range is independent of a target output of the gas turbine engine.

12. The fuel system of claim 10, wherein the pump is a first pump including a single outlet, the fuel system further including a second pump to further increase the pressure of the hydrogen fuel moving from the liquid hydrogen storage tank to the at least one of gaseous or liquid hydrogen storage tank, the second pump including a single outlet.

13. The fuel system of claim 7, wherein the valve is a first valve, further including:

a second valve positioned downstream of the at least one of gaseous or liquid hydrogen storage tank and upstream of the combustor; and programmable circuitry to control a position of the valve based on a target output for the gas turbine engine.

14. The fuel system of claim 7, wherein the programmable circuitry is a first programmable circuitry, further including:

a pump to increase a pressure of the hydrogen fuel moving from the liquid hydrogen storage tank to the at least one of gaseous or liquid hydrogen storage tank; and a second programmable circuitry to cause the pump to maintain a pressure in the at least one of gaseous or liquid hydrogen storage tank approximately constant.

15. The fuel system of claim 7, wherein the programmable circuitry adjusts the position of the valve to increase the flow rate of the hydrogen fuel from the at least one of gaseous or liquid hydrogen storage tank to the liquid hydrogen storage tank in response to the pressure in the liquid hydrogen storage tank not satisfying a threshold.

16. A fuel system comprising:

a gas turbine engine;

a liquid hydrogen storage tank to hold hydrogen fuel in a liquid phase;

an at least one of gaseous or liquid hydrogen storage tank to hold the hydrogen fuel in at least one of a gaseous phase or the liquid phase;

a pump to pressurize the hydrogen fuel flowing from the liquid hydrogen storage tank to the at least one of gaseous or liquid hydrogen storage tank; and programmable circuitry operatively coupled to the pump, the programmable circuitry to cause the pump to maintain a pressure in the at least one of gaseous or liquid hydrogen storage tank at an approximately constant pressure throughout operations associated with the gas turbine engine.

17. The fuel system of claim 16, further including a nozzle, and wherein the gas turbine engine includes a combustor, the nozzle to inject the hydrogen fuel in the gaseous phase into the combustor, and wherein the at least one of gaseous or liquid hydrogen storage tank is positioned between the liquid hydrogen storage tank and the nozzle in a hydrogen fuel flow path.

18. The fuel system of claim 17, wherein the programmable circuitry is a first programmable circuitry, the fuel system further including a second programmable circuitry to control a flow of the hydrogen fuel from the at least one of gaseous or liquid hydrogen storage tank to the nozzle based on the operations associated with the gas turbine engine.

19. The fuel system of claim 16, wherein the programmable circuitry is a first programmable circuitry, wherein the pressure in the at least one of gaseous or liquid hydrogen storage tank is a first pressure, and further including a second programmable circuitry and a valve, wherein a position of the valve corresponds with a flow of the hydrogen fuel from the at least one of gaseous or liquid hydrogen storage tank to the liquid hydrogen storage tank, the second programmable circuitry to control the position of the valve based on a second pressure in the liquid hydrogen storage tank.

20. The fuel system of claim 16, wherein the operations associated with the gas turbine engine include more than one power output of the gas turbine engine or more than one speed output of the gas turbine engine.

* * * * *